(12) United States Patent
Kihara et al.

(10) Patent No.: US 8,403,404 B2
(45) Date of Patent: Mar. 26, 2013

(54) VEHICLE BODY FRONT STRUCTURE AND MANUFACTURING METHOD THEREOF

(75) Inventors: Makoto Kihara, Wako (JP); Tomoya Takeda, Wako (JP); Toshiyuki Yanaoka, Wako (JP); Masakazu Kashiwagi, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 87 days.

(21) Appl. No.: 13/154,664

(22) Filed: Jun. 7, 2011

(65) Prior Publication Data

US 2011/0304176 A1 Dec. 15, 2011

(30) Foreign Application Priority Data

Jun. 9, 2010 (JP) ................................. 2010-132200
Jun. 29, 2010 (JP) ................................. 2010-147960

(51) Int. Cl.
*B60N 99/00* (2006.01)
(52) U.S. Cl. .................................. 296/193.09; 293/115
(58) Field of Classification Search ............. 296/193.09; 293/115; 180/68.4, 68.1; 165/41, 67
See application file for complete search history.

(56) References Cited

U.S. PATENT DOCUMENTS

| | | | |
|---|---|---|---|
| 7,117,926 B2 * | 10/2006 | Mori et al. ...................... | 165/67 |
| 7,703,566 B2 * | 4/2010 | Wilson et al. ................ | 180/68.4 |
| 2003/0062148 A1 | 4/2003 | Ohki | |
| 2008/0308333 A1 | 12/2008 | Kapadia et al. | |

FOREIGN PATENT DOCUMENTS

| | | |
|---|---|---|
| EP | 2080690 A1 | 7/2009 |
| JP | 11-115656 | 4/1999 |
| JP | 11-129935 | 5/1999 |
| JP | 11-263246 | 9/1999 |
| JP | 2004-331002 | 11/2004 |
| JP | 2008-132960 | 6/2008 |
| JP | 2008-247223 | 10/2008 |
| JP | 2009-137482 | 6/2009 |
| WO | 2009072673 A1 | 6/2009 |

* cited by examiner

*Primary Examiner* — Lori L. Lyjak
(74) *Attorney, Agent, or Firm* — Rankin, Hill & Clark LLP

(57) ABSTRACT

A vehicle body front structure is disclosed in which a cooling system component is provided to an upper beam and a lower beam of a front bulkhead. A vehicle body front structure comprises a left top support mechanism provided to the upper beam and a left bottom support mechanism provided to the upper beam. The left top support mechanism supports a left top part of the cooling system component, and supports the left top part of the cooling system component so as to allow the left top part to move toward the rear of the vehicle body. The left bottom support mechanism supports a left bottom part of the cooling system component, and supports the left bottom part of the cooling system component so as to allow the left bottom part to move toward the rear of the vehicle body.

6 Claims, 22 Drawing Sheets

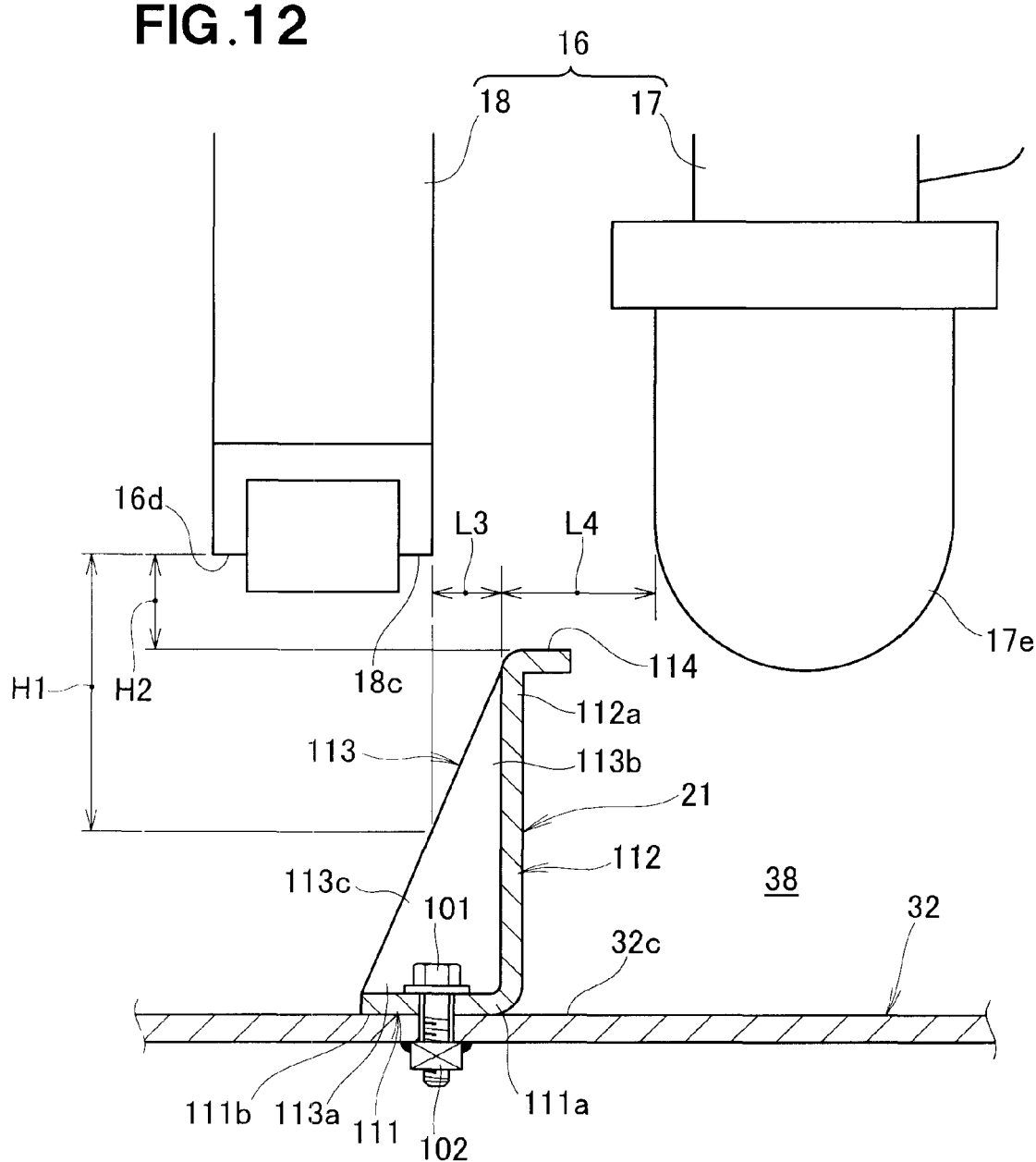

VEHICLE BODY FRONT STRUCTURE AND MANUFACTURING METHOD THEREOF

FIELD OF THE INVENTION

The present invention relates to a vehicle body front structure in which a cooling system component is provided to an upper beam and a lower beam of a front bulkhead.

BACKGROUND OF THE INVENTION

Among vehicle body front structures, there are those having a structure in which a front bulkhead is provided to left and right front side frames and left and right upper members, and a cooling system component is provided to the front bulkhead.

The top part of the cooling system component is attached to an upper beam of the front bulkhead, and the bottom part of the cooling system component is attached to a lower beam of the front bulkhead via a lower support bracket.

The upper beam is fastened to left and right upper members by bolts so as to be capable of moving toward the rear of the vehicle body. The lower support bracket is fastened to the lower beam by bolts so as to be capable of moving toward the rear of the vehicle body.

According to the vehicle body front structure described above, when an impact load (input) acts on the front of the vehicle body due to a light collision, for example, the top part of the cooling system component moves with the upper beam toward the rear of the vehicle body. Similarly, the bottom part of the cooling system component moves with the lower support bracket toward the rear of the vehicle body. Vehicle body front structures are known in which damage to the cooling system component by the impact load is prevented due to the top and bottom parts of the cooling system component moving toward the rear of the vehicle body in this manner, such as the structure disclosed in Japanese Patent Application Laid-Open Publication No. 2009-137482 (JP-A 2009-137482), for example.

Usually in a vehicle body front structure, the upper beam and the lower beam are connected integrally by left and right side legs, thereby giving the front bulkhead a substantially triangular frame shape and ensuring rigidity in the front bulkhead.

However, in the vehicle body front structure disclosed in JP-A 2009-137482, since the upper beam is attached to left and right upper members so as to be capable of moving toward the rear of the vehicle body, steps must be taken to ensure the rigidity of the front bulkhead, in which there is room for improvement.

Furthermore, in the vehicle body front structure disclosed in JP-A 2009-137482, the upper beam is fastened to the left and right upper members by bolts so as to be capable of moving toward the rear of the vehicle body, and the lower support bracket is fastened to the lower beam by bolts so as to be capable of moving toward the rear of the vehicle body. Therefore, when the upper beam is assembled on the upper members (the vehicle body), the fastening load of the bolts must be adjusted so that the upper beam is capable of moving toward the rear of the vehicle body. Similarly, when the lower support bracket is assembled on the lower beam (the vehicle body), the fastening load of the bolts must be adjusted so that the lower support bracket is capable of moving toward the rear of the vehicle body.

Thus, when the upper beam and the lower support bracket are assembled as component units, adjusting the fastening load requires more labor than adjusting the fastening loads of bolts. Therefore, labor is required for assembling the cooling system component on the front bulkhead, which also leaves room for improvement.

Furthermore, the vehicle body front structure disclosed in Japanese Laid-open Patent Publication No. 2009-137482 has the lower support bracket located between the lower beam and the bottom part of the cooling system component in order to allow the bottom part of the cooling system component to move toward the rear of the vehicle body. Consequently, a space must be ensured for placing the lower support bracket between the lower beam and the bottom part of the cooling system component.

However, when a space is ensured between the lower beam and the bottom part of the cooling system component, some of the air led in from the front of the vehicle body while the vehicle is traveling flows toward the rear of the vehicle body (the engine compartment) via this space. Therefore, it is difficult for air led in from the front of the vehicle to be led efficiently to the cooling system component, which also leaves room for improvement.

SUMMARY OF THE INVENTION

An object of the present invention is to provide a vehicle body front structure whereby damage to a cooling system component by an impact load can be prevented, rigidity of a front bulkhead can be ensured, and the cooling system component can be assembled easily in the front bulkhead.

According to one aspect of the present invention, there is provided a vehicle body front structure including a front bulkhead having a an upper beam and a lower beam, and a cooling system component having a top part provided to the upper beam and a bottom part provided to the lower beam, said vehicle body front structure comprising: a top support mechanism, provided to the upper beam, for supporting the top part of the cooling system component in such a manner as to be movable rearwardly of a vehicle body; and a bottom support mechanism, provided to the lower beam, for supporting the bottom part of the cooling system component in such a manner as to be movable rearwardly of the vehicle body.

In the present invention thus arranged, since the top support mechanism supports the top part of the cooling system component in a manner that allows it to move toward the rear of the vehicle body and the bottom support mechanism supports the bottom part of the cooling system component in a manner that allows it to move toward the rear of the vehicle body, when an impact load acts on the top and bottom support mechanisms from the front of the vehicle body toward the rear of the vehicle body, the cooling system component can be moved toward the rear of the vehicle body by the top and bottom support mechanisms, and damage to the cooling system component by the load is prevented.

Furthermore, since the top and bottom support mechanisms are provided to the upper beam and the lower beam, there is no need for the upper beam and the lower beam to be moved toward the rear of the vehicle body, the upper beam and the lower beam can be provided integrally and firmly, and sufficient rigidity of the front bulkhead can be ensured. The rigidity of the vehicle body front structure can thereby be ensured by the front bulkhead, and the rigidity of the vehicle body front structure can be adapted to various power units (e.g. engine transmission units).

It is preferred that the top support mechanism comprise: an upper support bracket provided to the upper beam; an upper movement bracket provided to the top part of the cooling system component and having slits formed in a region thereof corresponding to the upper support bracket and opening forwardly of the vehicle body; and top fastening means having top fastening members passed through the slits in order to fasten the upper movement bracket to the upper support bracket. Thus, the top fastening members can be removed from the slits by moving the upper movement bracket toward the rear of the vehicle body. In other words, the upper movement bracket can be removed from the upper support bracket (the upper beam). The restraint on the top part of the cooling system component is thereby released, the top part of the cooling system component can be moved comparatively far toward the rear of the vehicle body, and damage to the cooling system component by the load can be more satisfactorily prevented. Furthermore, the load can be prevented from acting on the upper beam by removing the upper movement bracket from the upper beam. Therefore, deformation of the upper beam (the front bulkhead) by the load can be minimized, and maintenance costs (repair costs) can be reduced.

Preferably, the top fastening means includes a top resilient member located between the upper movement bracket and the top fastening members. Therefore, the fastening load of the top fastening members can be suitably adjusted by the top resilient member. It is thereby easy to manage the withdrawal load when the slits of the upper movement bracket are separated from the top fastening members, and satisfactory performance quality can be preserved.

It is desirable that the upper movement bracket have an upper contact part on which a load acts rearwardly of the vehicle body, and the top fastening means be provided to both vehicle-widthwise sides of the upper movement bracket. Thus, the upper movement bracket can be moved stably in the desired direction. Furthermore, a pair of top fastening means can be provided in the substantial center in the vehicle forward-backward direction of the upper movement bracket. Consequently, there is no need for the shape of the upper movement bracket to protrude far toward the rear of the vehicle body, and the upper movement bracket can be reduced in size.

In this manner, the upper movement bracket can be reduced in size, and the protruding direction and protruding amount of the upper movement bracket toward the rear of the vehicle body can be suitably controlled by allowing the upper movement bracket to stably slide in the desired direction (toward the rear of the vehicle body). It is thereby possible to satisfactorily avoid interference by the cooling system component when the cooling system component moves toward the rear of the vehicle body.

It is preferable that the bottom support mechanism comprise: a lower support bracket provided to the lower beam; a lower movement bracket provided to the bottom part of the cooling system component and having a slot formed in a region thereof corresponding to the lower support bracket and extending forwardly of the vehicle body; and bottom fastening means having a bottom fastening bolt passed through the slot in order to fasten the lower movement bracket to the lower support bracket. Thus, since the slot extends in the forward-backward direction of the vehicle body and the lower movement bracket is fastened with the bottom fastening member to the lower support bracket via the slot, when the lower movement bracket is moved toward the rear of the vehicle body, the lower movement bracket can be moved along the bottom fastening member via the slot. The lower movement bracket (the cooling system component) can thereby be slid stably in the desired direction. Furthermore, when the lower movement bracket has finished sliding, the cooling system component can be held in place so as not to separate from the front bulkhead. The cooling system component can thereby be satisfactorily protected, and damage to the cooling system component by the load can be more satisfactorily prevented.

Desirably, the bottom fastening means has a bottom resilient member positioned between the lower support bracket and the bottom fastening bolt. Thus, the fastening load of the bottom fastening member can be suitably adjusted by the bottom resilient member. It is thereby easy to manage the movement load when the lower movement bracket moves along the slot via the bottom fastening member, and satisfactory performance quality can be preserved.

Preferably, the lower movement bracket has a lower contact part on which a load acts rearwardly of the vehicle body, while the bottom fastening means is provided to both vehicle-widthwise sides of the lower movement bracket. Therefore, the lower movement bracket can be moved more stably in the desired direction. Furthermore, by providing the bottom fastening means to both vehicle-widthwise sides of the lower movement bracket, a pair of bottom fastening means can be provided to the substantial center in the vehicle forward-backward direction of the lower movement bracket. Consequently, there is no need for the shape of the lower movement bracket to protrude far toward the rear of the vehicle body, and the lower movement bracket can be reduced in size.

Thus, the lower movement bracket can be reduced in size, and the protruding direction and protruding amount of the lower movement bracket toward the rear of the vehicle body can be suitably controlled by allowing the lower movement bracket to stably slide in the desired direction (toward the rear of the vehicle body). Consequently, when the cooling system component moves toward the rear of the vehicle body, it is possible to satisfactorily avoid interference by the lower movement bracket and the cooling system component with components (engine accessories, batteries, and the like) positioned behind the cooling system component.

It is preferred that the vehicle body front structure further comprise a wall member disposed in a space between the lower beam and the bottom part of the cooling system component and partitioning the space to fore and aft. Therefore, air led in from the front of the vehicle toward the space between the lower beam and the bottom part of the cooling system component can be guided to the cooling system component by the wall member. The air led in from the front of the vehicle can thereby be efficiently led to the cooling system component, and the cooling performance of the cooling system component can be ensured.

In a preferred form, the wall member is disposed in a position distanced from the cooling system component in a forward-backward direction of the vehicle body. Therefore, when the cooling system component vibrates up and down due to traveling vibration of the vehicle, the cooling system component can be prevented from interfering with the wall member.

Desirably, the wall member comprises: an attachment seat attached to the lower beam; a wall panel rising from the attachment seat and partitioning the space to fore and aft; and substantially triangular reinforcing ribs connecting the wall panel and the attachment seat. Therefore, the wall panel can be reinforced by the reinforcing ribs, and the wall panel can be prevented from tilting or falling over toward the rear of the vehicle body by the air led in while the vehicle is traveling. The air led in toward the space between the lower beam and the bottom part of the cooling system component from the front of the vehicle can thereby be guided to the cooling system component by the wall panel, and a satisfactory cooling performance of the cooling system component can be ensured.

It is preferred that the wall member have a protruding piece protruding from a top end of the wall panel toward the cooling system component positioned at a rear part of the vehicle body.

After the air led in from the front of the vehicle body while the vehicle is traveling has passed through the cooling system component, some of the air flows from the bottom part of the cooling system component to the wall panel. The air flowing to the wall panel is believed to flow over the top end of the wall panel and return (recirculate) to the front of the wall panel. In view of this, the protruding piece is provided to the top end of the wall panel, and the air flowing to the wall panel is prevented by the protruding piece from flowing over the top end of the wall panel. By causing the protruding piece to extend out from the top end of the wall panel, the air flowing to the wall panel can be prevented by the extended protruding piece from flowing over the top end of the wall panel.

Thus, by providing the protruding piece to the top end of the wall panel, it is possible to prevent some of the air passing through the cooling system component from returning (recirculating) top fastening members from the bottom part of the cooling system component via the wall panel 1

It is preferred that the cooling system component include a front cooling system component provided at a front part of the vehicle body, and a rear cooling system component provided on a rear part of the vehicle body, and the wall member be provided between the front cooling system component and the rear cooling system component.

After the air led in from the front of the vehicle body while the vehicle is traveling has passed through the cooling system component, some of the air flows from the bottom part of the rear cooling system component to the wall panel. Therefore, when the wall member is provided on the vehicle-frontward side of the front cooling system component, the air flowing from the bottom part of the rear cooling system component to the wall panel flows in between the front and rear cooling system components, and it is difficult to ensure the cooling performance of the front and rear cooling system components.

When the wall member is provided on the vehicle-rearward side of the rear cooling system component, the wall member becomes too far separated toward the rear of the vehicle body from the front cooling system component. Consequently, air led in from the front of the vehicle body toward the space between the lower beam and the bottom part of the cooling system component is not easily led to the front cooling system component by the wall member, and it is difficult to ensure the cooling performance of the front and rear cooling system components. In view of this, the wall member is provided between the front cooling system component and the rear cooling system component. Therefore, air flowing from the bottom part of the rear cooling system component can be prevented from flowing in between the front and rear cooling system components, and furthermore, the air led in from the front of the vehicle body can be led by the wall member to the front cooling system component. It is thereby possible to ensure the cooling performance of the front cooling system component and the rear cooling system component.

Furthermore, by providing the wall member between the front cooling system component and the rear cooling system component, the wall member can be disposed in a position (i.e. an offset position) separated from the front and rear cooling system components in the forward-backward direction of the vehicle body. The front and rear cooling system components can thereby be prevented from interfering with the wall member when the front and rear cooling system components vibrate up and down due to traveling vibration of the vehicle. Furthermore, the front and rear cooling system components can be prevented from interfering with the wall member even when the front and rear cooling system components vibrate forward and backward when the vehicle is accelerating or stopping, Additionally, the front cooling system component is disposed toward the front of the vehicle body from the wall member, and the rear cooling system component is disposed toward the rear of the vehicle body from the wall member. It is thereby possible to cause the front and rear cooling system components to move toward the rear of the vehicle body without interfering with the wall member, by disposing only the bottom part of the front cooling system component above the wall member, the bottom part being disposed top fastening members from the wall member. Specifically, the rear cooling system component is provided toward the rear of the vehicle body from the wall member. Consequently, even if the bottom part of the rear cooling system component is extended below the wall member, the bottom part of the rear cooling system component can be moved toward the rear of the vehicle body without interfering with the wall member. The shape of the rear cooling system component can thereby be formed as desired, and the design can have a greater degree of freedom.

Thus, by disposing only the bottom part of the front cooling system component above the wall member, the front and rear cooling system components can be made capable of moving toward the rear of the vehicle body. Thereby, when an obstacle or the like collides lightly with the front of the vehicle body, for example, the front and rear cooling system components can be moved toward the rear of the vehicle body and damage to the front and rear cooling system components by the collision load can be prevented.

According to another aspect of the present invention, there is provided a method for manufacturing a vehicle body front structure in which a top part of a cooling system component is provided to an upper beam of a front bulkhead, and a bottom part of the cooling system component is provided to a lower beam of the front bulkhead, the method comprising the steps of; fastening an upper movement bracket, which can be attached to the top part of the cooling system component, to an upper support bracket, which can be attached to the upper beam, by top fastening means so that the upper movement bracket is free to move toward the rear of the vehicle body; fastening a lower movement bracket, which can be attached to the bottom part of the cooling system component, to a lower support bracket, which can be attached to the lower beam, by bottom fastening means so that the lower movement bracket is free to move toward the rear of the vehicle body; supporting the top part of the cooling system component on the upper movement bracket, and supporting the bottom part of the cooling system component on the lower movement bracket; and attaching the upper support bracket to the upper beam, and attaching the lower support bracket to the lower beam.

In the method described above, the upper movement bracket is fastened to the upper support bracket by the top fastening means before the upper support bracket is attached to the upper beam of the front bulkhead. Therefore, it is possible to suitably adjust the fastening load when the upper movement bracket is fastened to the upper support bracket by the top fastening means. Similarly, the lower movement bracket is fastened to the lower support bracket by the bottom fastening means before the lower support bracket is attached to the lower beam of the front bulkhead. Therefore, it is possible to suitably adjust the fastening load when the lower movement bracket is fastened to the lower support bracket by the bottom fastening means.

Thus, by suitably adjusting the fastening load of the top and bottom fastening means, it is easy to manage the fastening load and a satisfactory performance can be preserved. Therefore, the cooling system component can easily be assembled on the front bulkhead.

Additionally, the upper movement bracket is fastened to the upper support bracket by the top fastening means so as to be capable of moving toward the rear of the vehicle body, and the lower movement bracket is fastened to the lower support bracket by the bottom fastening means so as to be capable of moving toward the rear of the vehicle body. Therefore, when a load acts on the upper support bracket and the upper movement bracket from the front of the front bulkhead toward the rear of the vehicle body, the cooling system component can be moved together with both support brackets toward the rear of the vehicle body. The cooling system component can thereby be moved toward the rear of the vehicle body to prevent damage to the cooling system component by the load.

BRIEF DESCRIPTION OF THE DRAWINGS

Certain preferred embodiments of the present invention will be described in detail below, by way of example only, with reference to the accompanying drawings, in which:

FIG. 12 is an enlarged view showing area 12 of FIG. 11;

DETAILED DESCRIPTION OF THE PREFERRED EMBODIMENTS

The front side frames, upper members, and upper side frames constituting the framework of a vehicle body front structure 10 according to the present embodiment are bilaterally symmetric; therefore, the left-side components are described and descriptions of the right-side components are omitted.

Figure 1:
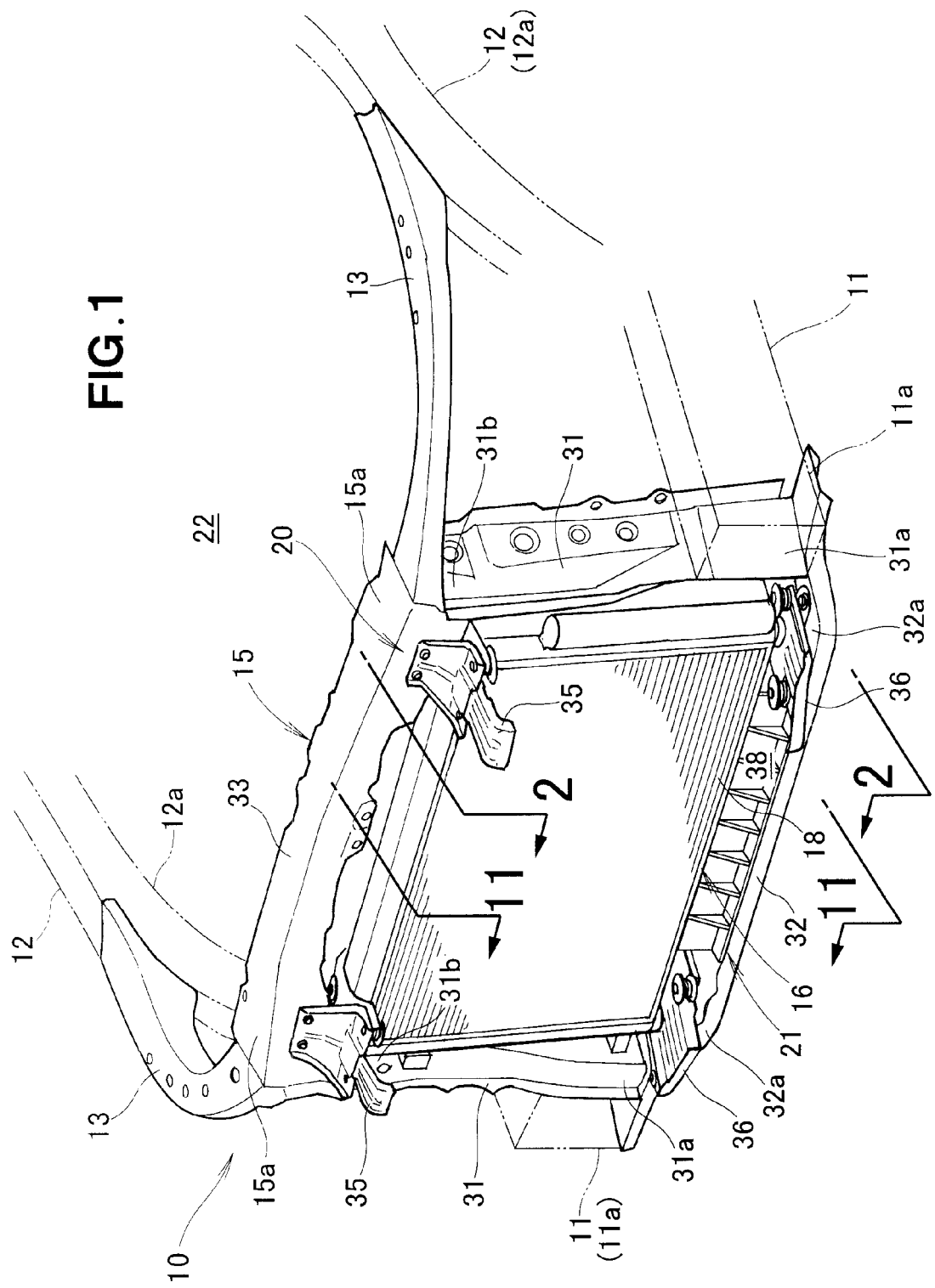
FIG. 1 is a perspective view showing a vehicle body front structure according to an embodiment of the present invention.

As shown in FIG. 1, the vehicle body front structure 10 comprises left and right front side frames 11 provided to the left and right sides of the front of the vehicle body, left and right upper members 12 provided above the outer sides of the left and right front side frames 11, left and right upper side frames 13 provided to the left and right upper members 12, a bulkhead 15 provided to the left and right upper side frames 13 and the left and right front side frames 11, a cooling system support unit 20 which is provided to the bulkhead 15 and which supports a cooling system component 16, and a wall member 21 provided within the cooling system support unit 20.

Figure 2:
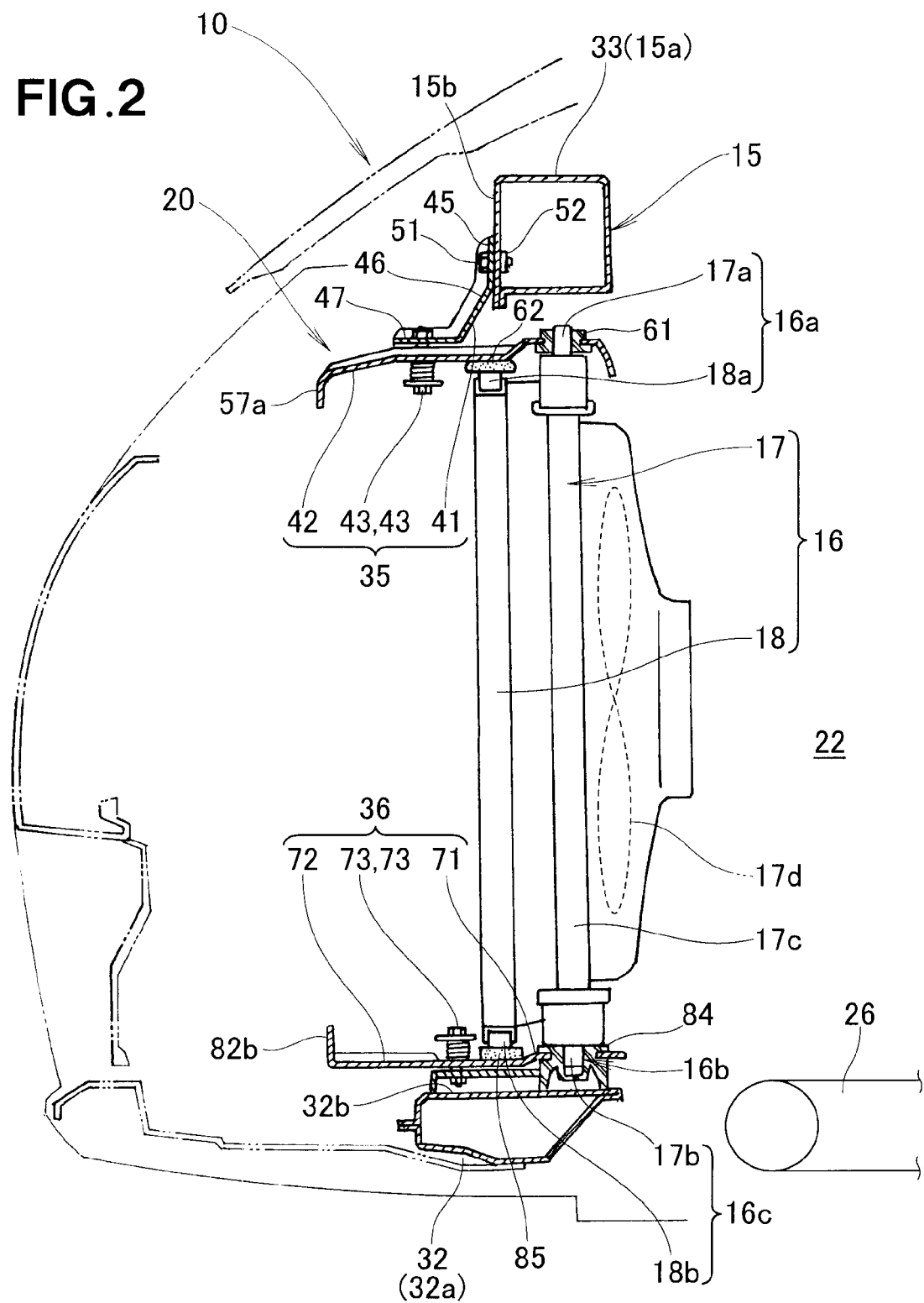
FIG. 2 is a cross-sectional view taken along line 2-2 of FIG. 1.
Figure 3:
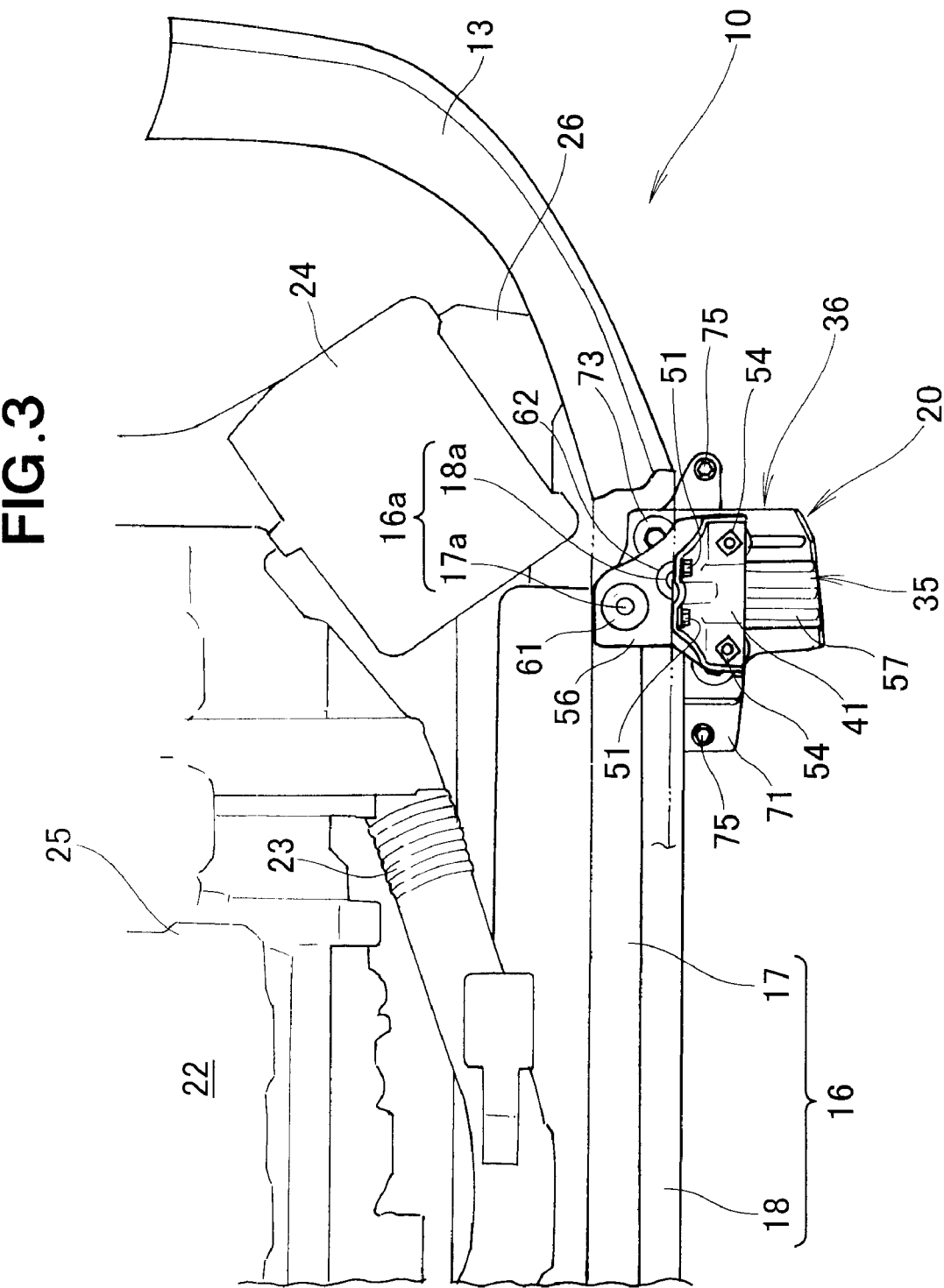
FIG. 3 is a plan view showing part of the vehicle body front structure of FIG. 1.

The cooling system component 16 comprises a radiator (a rear cooling system component) 17 provided to a region facing an engine compartment 22, and a condenser (a front cooling system component) 18 provided in front of the radiator 17, as shown in FIGS. 2 and 3.

The radiator 17 is provided to the side facing rearward in the vehicle body, and the radiator cools the cooling water of the engine, for example. The radiator 17 comprises a cooling fan 17d on the side of a radiator main body 17c that faces rearward in the vehicle body.

The condenser 18 is provided in front of the radiator 17 in the vehicle body, and the condenser cools and liquefies refrigerant gas for air conditioning, for example.

An air intake duct (an engine accessory) 23 and a battery 24 are provided within the engine compartment 22, to the rear of the radiator 17 in the vehicle body. The air intake duct 23 is a duct for leading air to a carburetor of an engine 25. A sub frame 26 for mounting the engine 25 is provided below the engine compartment 22.

The left front side frame 11 is disposed on the left side of the vehicle body front, and is made to extend in the vehicle body forward-backward direction, as shown in FIG. 1. The left top member 12 is disposed above and to the outside of the left front side frame 11, the rear end being connected to a left front pillar (not shown), and the front end being bonded to a front end 11a of the left front side frame 11 by welding (e.g., spot welding).

The left top side frame 13 extends toward the front of the vehicle body from the substantial center 12a of the left top member 12, and also extends toward the vehicle-widthwise center in a curving shape up to a left top end 15a of the bulkhead 15.

The bulkhead 15 is a frame member formed into a substantially rectangular shape by left and right side legs 31 provided to the left and right front side frames 11, a lower beam 32 provided between bottom ends 31a of the left and right side legs 31, and an upper beam 33 provided between top ends 31b of the left and right side legs 31.

The lower beam 32 extends between the bottom end 31a of the left side leg 31 and the bottom end 31a of the right side leg 31. Specifically, a left end 32a of the lower beam 32 is joined by welding (e.g. spot welding) to the bottom end 31a of the left side leg 31, and a right end 32a is joined by welding (e.g. spot welding) to the bottom end 31a of the right side leg 31.

The upper beam 33 extends between the top end 31b of the left side leg 31 and the top end 31b of the right side leg 31. Specifically, the left end (the left top end) 15a of the upper beam 33 is joined by welding (e.g. spot welding) to the top end 31b of the left side leg 31, and a right end (a right upper end) 15a is joined by welding (e.g. spot welding) to the top end 31b of the right side leg 31. The cooling system support unit 20 which supports the cooling system component 16 is provided to the bulkhead 15.

The cooling system support unit 20 comprises left and right top support mechanisms 35 provided to the left and right ends 15a of the upper beam 33, and left and right bottom support mechanisms 36 provided to left and right ends 32a of the lower beam 32.

A bumper beam (not shown) is provided to the vehicle body front side of the cooling system support unit 20. An impact load (a load, input) acts on the bumper beam from the front of the vehicle body toward the rear, whereby the impact load acting on the bumper beam is transferred to the cooling system support unit 20 via the bumper beam.

Figure 4:
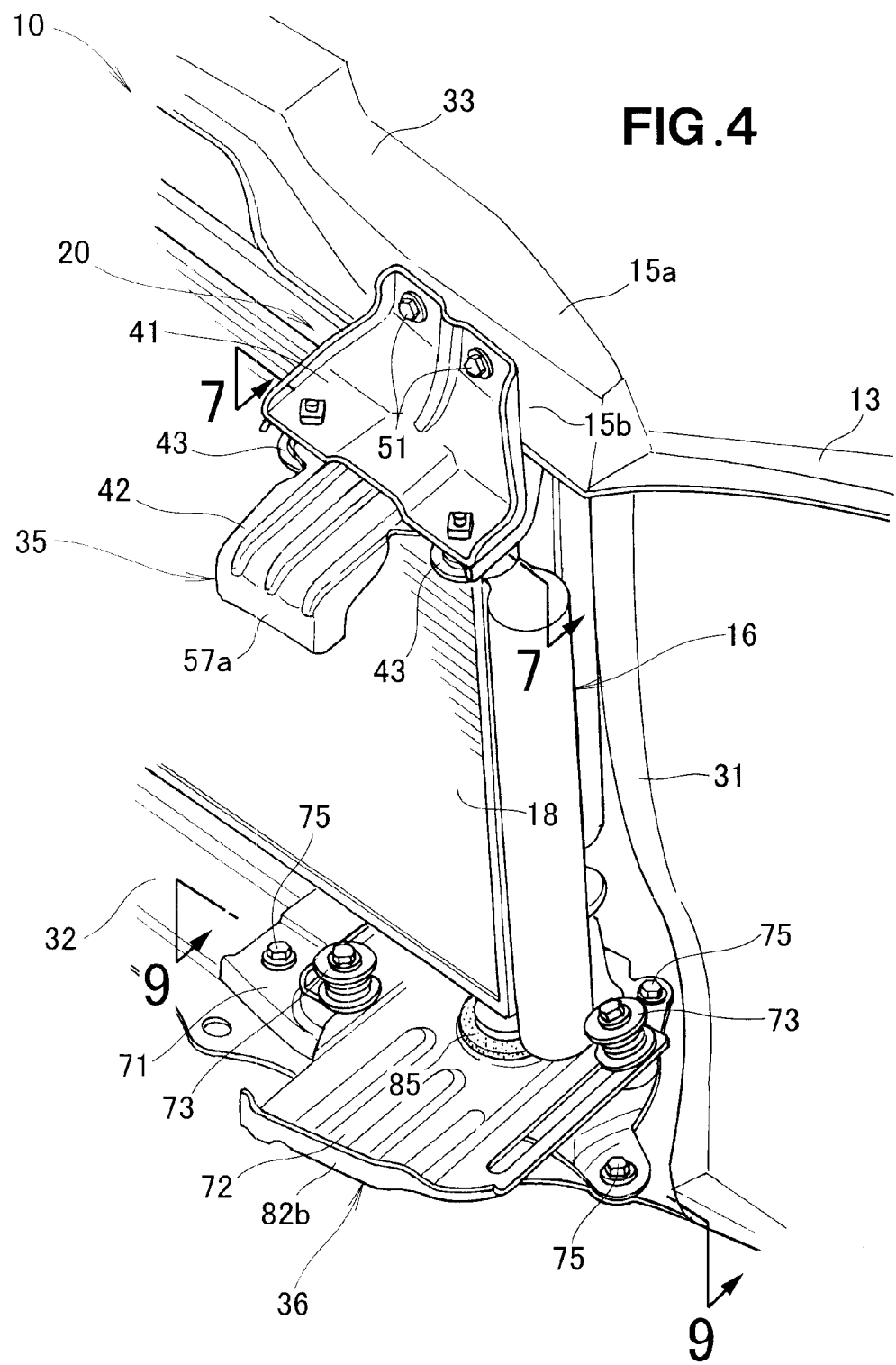
FIG. 4 is a perspective view showing part of the vehicle body front structure of FIG. 1.

As shown in FIG. 4, the left top support mechanism 35, is provided to the left end 15a of the upper beam 33 and is capable of supporting a left top part 16a (FIGS. 2 and 3) of the cooling system component 16, and the left top part 16a of the cooling system component 16 is capable of moving toward the rear of the vehicle body.

The left bottom support mechanism 36 is provided to a left end part 32a (FIG. 1) of the lower beam 32. Within a bottom part 16b of the cooling system component 16, a left bottom part 16c (FIG. 2) can be supported by the left bottom support mechanism 36, and the bottom part 16b of the cooling system component 16 is capable of moving toward the rear of the vehicle body.

Figure 5:
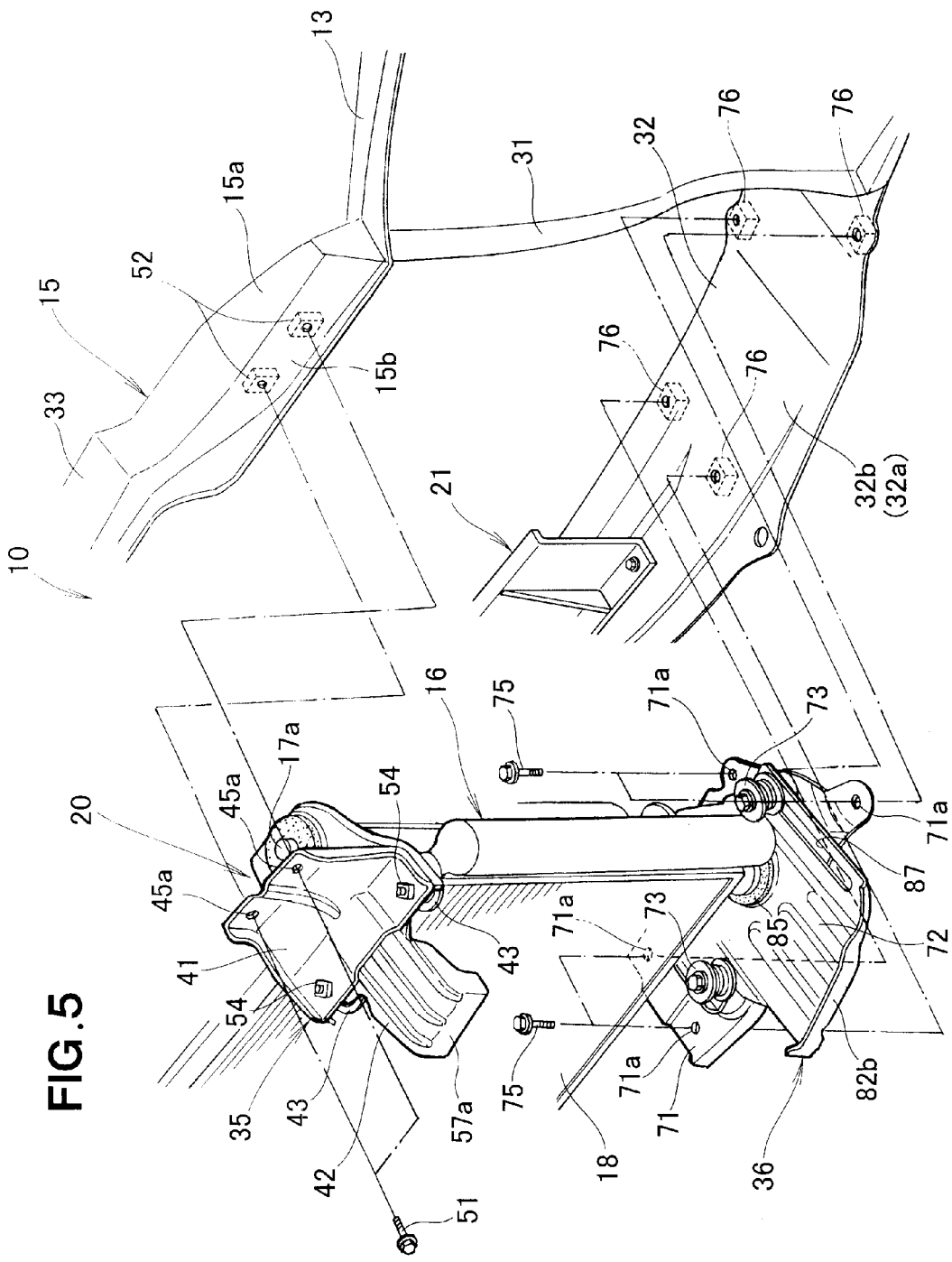
FIG. 5 is an exploded perspective view showing the vehicle body front structure of FIG. 4.
Figure 6:
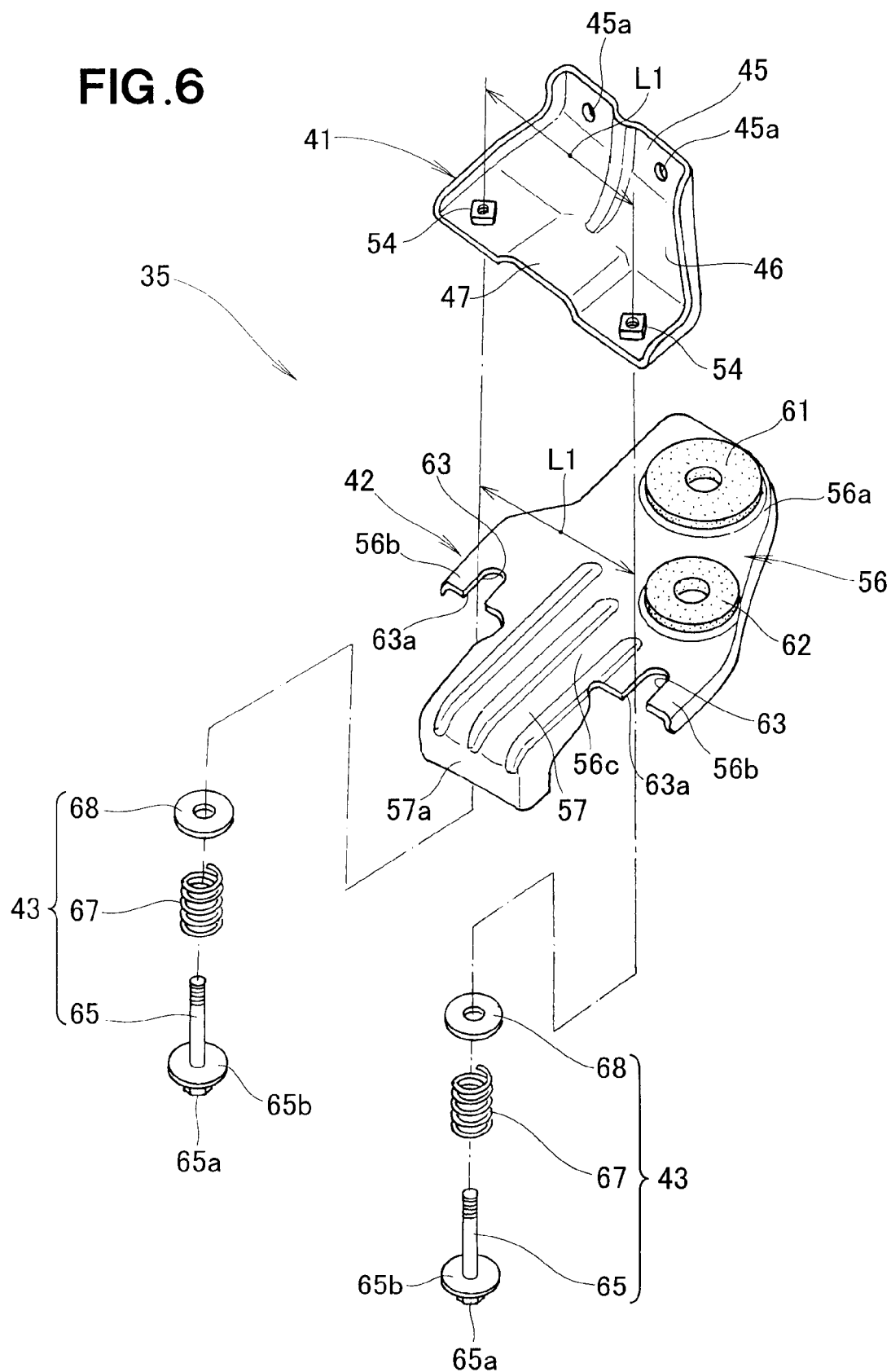
FIG. 6 is an exploded perspective view showing a left top support mechanism of FIG. 5.

As shown in FIGS. 4, 5, and 6, the left top support mechanism 35 comprises an upper support bracket 41 provided to the left end 15a of the upper beam 33, an upper movement bracket 42 provided to the left top part 16a (FIGS. 2 and 3) of the cooling system component 16, and a pair of top fastening means 43 for fastening the upper movement bracket 42 to the upper support bracket 41.

The upper support bracket 41 has a vertical part 45 provided to a front wall 15b in the left end 15a of the upper beam 33, an inclined part 46 (see also FIG. 2) jutting at a downward slope toward the front of the vehicle body from the bottom end of the vertical part 45, and a horizontal part 47 jutting substantially horizontally toward the front of the vehicle body from the front end of the inclined part 46.

The vertical part 45 has a pair of attachment holes 45a formed apart from each other by a predetermined gap in the vehicle width direction. By inserting bolts 51 through the pair of attachment holes 45a of the vertical part 45 and threading the bolts into a pair of weld nuts 52 of the front wall 15b, the vertical part 45 is attached along the front wall 15b by the pair of bolts 51. In this state, the horizontal part 47 is positioned below the upper beam 33 and to the front of the upper beam 33 (see also FIG. 2). On the top surface of the horizontal part 47, a pair of weld nuts 54 are welded a predetermined gap L1 apart from each other in the vehicle width direction.

The upper movement bracket 42 is disposed beneath the upper support bracket 41, along the horizontal part 47 of the upper support bracket 41. The upper movement bracket 42 has an upper support part 56 which supports a left top part 17a (see FIG. 2 also) of the radiator 17 and a left top part 18a (see FIG. 2) of the condenser 18, and an upper contact part 57 protruding toward the front of the vehicle body from the upper support part 56.

The upper support part 56 is a substantially trapezoidal region disposed beneath the horizontal part 47 of the upper support bracket 41 and running along the horizontal part 47. A top radiator support part 61 is provided to a rear end 56a of the upper support part 56, a top condenser support part 62 is provided toward the front of the vehicle body from the top radiator support part 61, and a pair of slits 63 are formed in the front left and right ends at a predetermined gap L1 apart from each other in the vehicle width direction.

The top radiator support part 61 supports the left top part 17a by fitting with the left top part 17a of the radiator 17. The top condenser support part 62 supports the left top part 18a by fitting with the left top part 18a of the condenser 18. Specifically, the upper support part 56 supports the left top part 16a of the cooling system component 16 by being provided to the left top part 16a (FIGS. 2 and 3) of the cooling system component 16.

The pair of slits 63 are respectively provided in regions 56b of the upper support part 56 that face the upper support bracket 41 (specifically, regions in the front left and right ends that face the pair of weld nuts 54 of the horizontal part 47). These slits 63 are guide grooves formed so as to open toward the front of the vehicle body, both having openings 63a in their front ends.

The upper movement bracket 42 is capable of moving toward the rear of the vehicle body along top fastening bolts 65 (described hereinafter) which fit through the slits 63, and the openings 63a pass over the top fastening bolts 65, whereby the top fastening bolts 65 can be removed from the slits 63.

The upper contact part 57 is a protruding piece which protrudes substantially horizontally toward the front of the vehicle body from the vehicle-widthwise center in the front end of the upper support part 56 (i.e. the front end center between the pair of slits 63), wherein a front end 57a curves downward. The upper contact part 57 is made to protrude from a front end center 56c of the upper support part 56, whereby an impact load during a light collision can be made to act on the front end 57a of the upper contact part 57 from the front of the vehicle body toward the rear of the vehicle body. The upper movement bracket 42 is fastened to the upper support bracket 41 by the pair of top fastening means 43.

Among the pair of top fastening means 43, one top fastening means 43 is provided toward the outside of the vehicle body from the upper contact part 57, and the other top fastening means 43 is provided toward the inside of the vehicle body (toward the center of the vehicle body) from the upper contact part 57.

The one top fastening means 43 comprises a top fastening bolt (top fastening member) 65 for fastening the upper movement bracket 42 to the upper support bracket 41, as well as a first washer 66, top spring member (top resilient member) 67, and second washer 68 which are fitted over the top fastening bolt 65. The first washer 66 may be used as a bolt referred to as a flange bolt, formed integrally with a head 65a of the top fastening bolt 65.

Since the other top fastening means 43 is a structural member identical to the one top fastening means 43, its structural members are denoted by the same symbols as the one top fastening means 43 and descriptions thereof are omitted.

Figure 7:
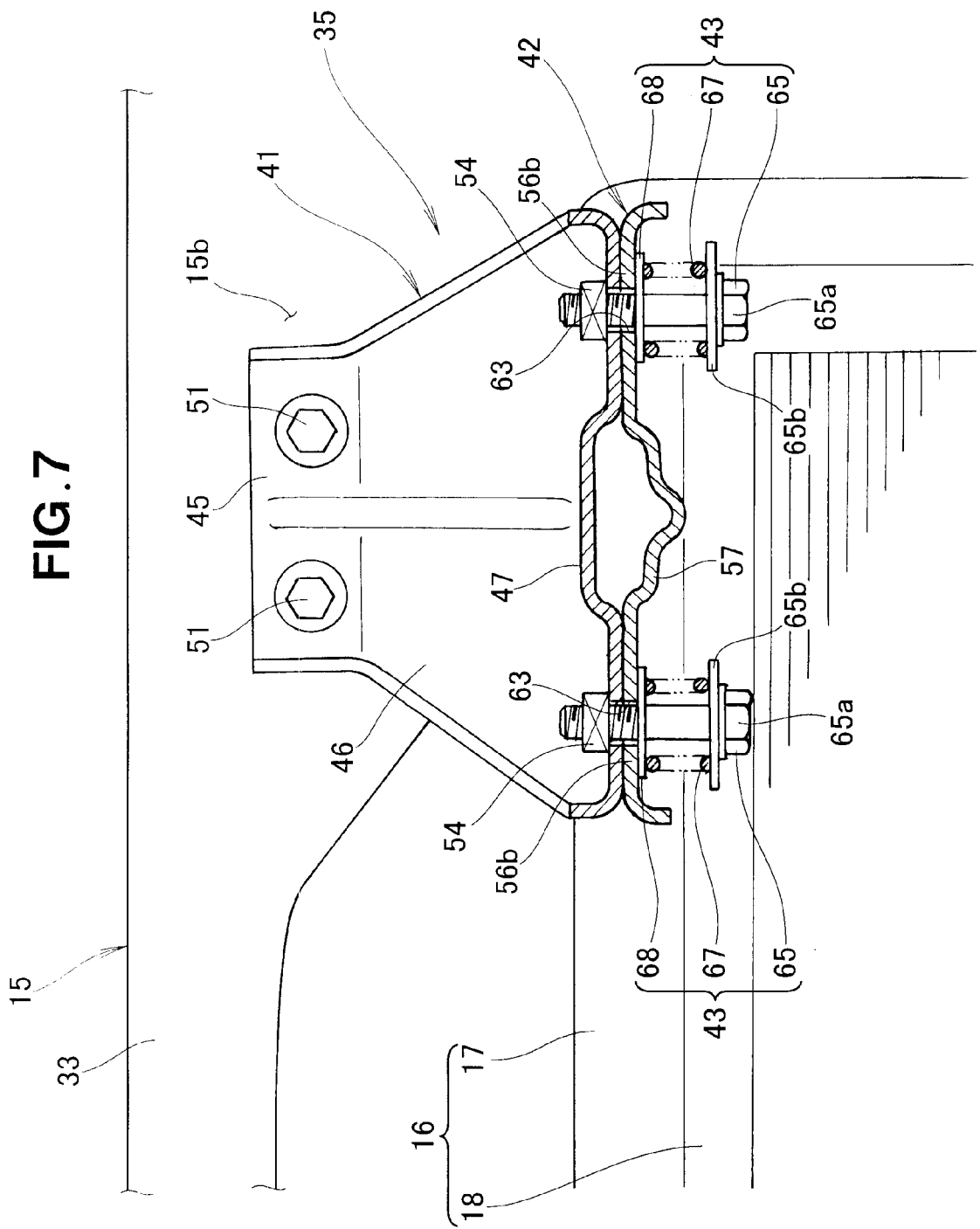
FIG. 7 is an enlarged cross-sectional view taken along line 7-7 of FIG. 4.

As shown in FIGS. 6 and 7, in a state in the one top fastening means 43 in which the top spring member 67 and the second washer 68 are fitted over the top fastening bolt 65, the top fastening bolt 65 is passed through one of the slits 63 (the one toward the outer side of the vehicle body) and threaded into one of the weld nuts 54 (the one toward the outer side of the vehicle body). The top spring member 67 is a compression spring.

In this state, the second washer 68 is brought in contact with the bottom surface of the front left end 56b of the upper support part 56, and the top spring member 67 is compressed and fitted in between the first washer 66 and the second washer 68.

In other words, the top spring member 67 is fitted in between the front left end 56b of the upper support part 56 and the head 65a of the top fastening bolt 65 while being compressed via the first washer 66 and the second washer 68.

In the other top fastening means 43, similar to the one top fastening means 43, the second washer 68 is brought in contact with the bottom surface of the front right end 56b of the upper support part 56, and the top spring member 67 is compressed and fitted in between the first washer 66 and the second washer 68.

In other words, the top spring member 67 of the other top fastening means 43 is fitted in between the front right end 56b of the upper support part 56 and the head 65a of the top fastening bolt 65 while being compressed via the first washer 66 and the second washer 68.

Thus, the one top fastening means 43 is provided toward the outside of the vehicle body from the upper contact part 57, and the other top fastening means 43 is provided toward the inside of the vehicle body (toward the center of the vehicle body) from the upper contact part 57, whereby the pair of top fastening means 43 are provided to both sides in the vehicle width direction of the upper movement bracket 42.

In this state, the pair of top fastening bolts 65 are passed respectively through the pair of slits 63. The upper movement bracket 42 is fastened to the upper support bracket 41 by the pair of top fastening means 43 so as to be free to move toward the rear of the vehicle body. The left top part 16a (FIGS. 2 and 3) of the cooling system component 16 is thereby provided to the upper beam 33 (the front wall 15b) via the left top support mechanism 35, so as to be free to move toward the rear of the vehicle body.

By providing top fastening means 43 on either of the vehicle-widthwise sides (toward the outside and center of the vehicle body) of the upper movement bracket 42, the pair of top fastening means 43 can be provided to the substantial center of the upper movement bracket 42 in the forward-backward direction of the vehicle body. Consequently, there is no need to greatly expand the shape of the upper movement bracket 42 toward the rear of the vehicle body, and the upper movement bracket 42 can be reduced in size.

Thus, by reducing the size of the upper movement bracket 42 and stably sliding the upper movement bracket 42 in the desired direction (toward the rear of the vehicle body), the protruding direction and protruding amount of the upper movement bracket 42 toward the rear of the vehicle body can be suitably controlled.

Furthermore, by fitting the top spring member 67 between the upper movement bracket 42 and the head 65a of the top fastening bolt 65, the fastening load of the top fastening bolt 65 can be suitably adjusted by the top spring member 67. It is thereby easy to manage the load when the slit 63 of the upper movement bracket 42 is removed from the top fastening bolt 65 (i.e. the "withdrawal load"), and a satisfactory performance quality can be preserved.

Figure 8:
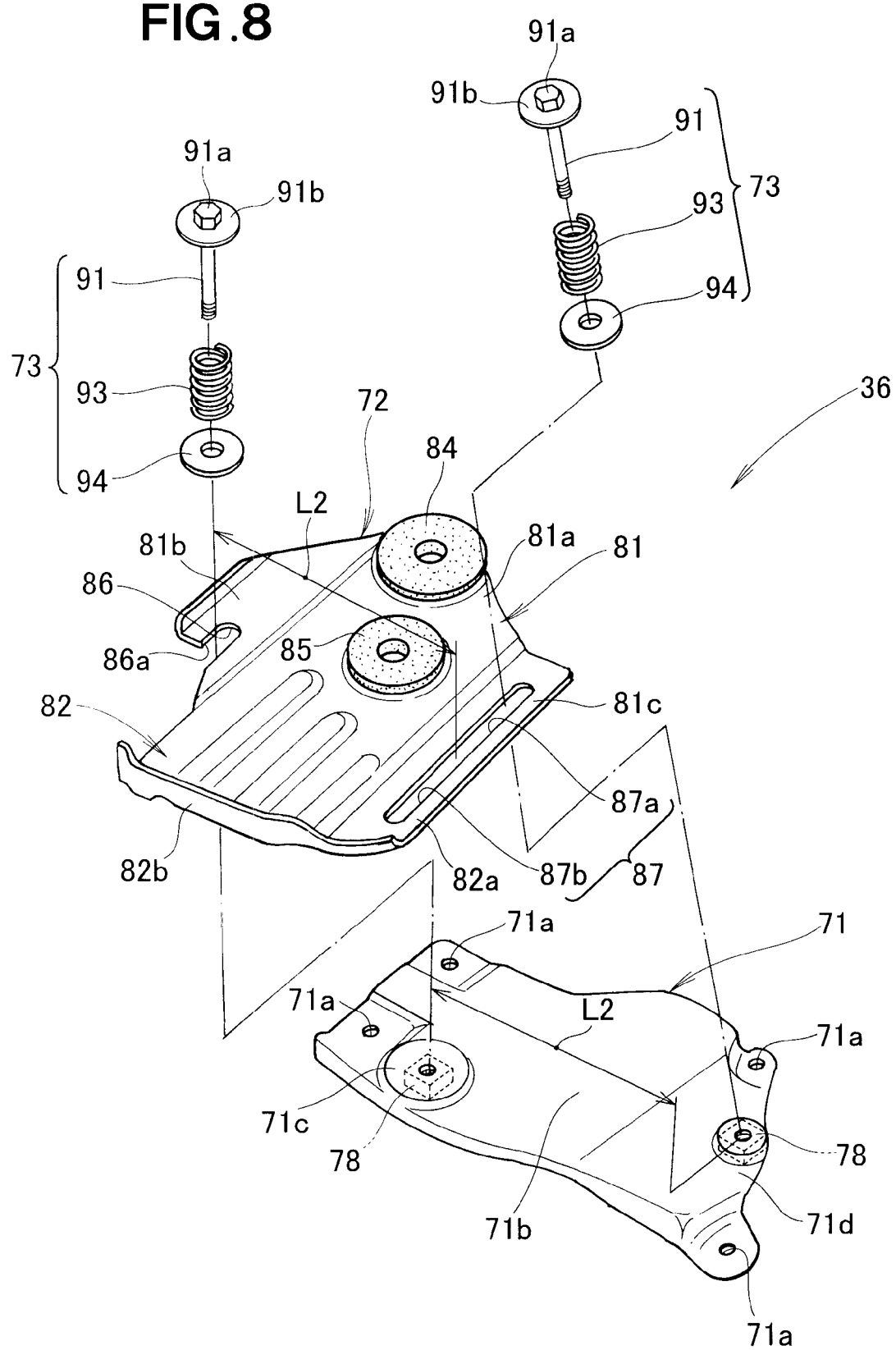
FIG. 8 is an exploded perspective view of the left bottom support mechanism shown in FIG. 5.

As shown in FIGS. 5 and 8, the left bottom support mechanism 36 comprises a lower support bracket 71 provided to the left end part 32a of the lower beam 32, a lower movement bracket 72 provided to the left bottom part 16c (FIG. 2) of the cooling system component 16, and a pair of bottom fastening means 73 for fastening the lower movement bracket 72 to the lower support bracket 71.

The lower support bracket 71 is provided along a top part 32b in the left end part 32a of the lower beam 32, and is formed into a substantially quadrangular shape. The lower support bracket 71 has attachment holes 71a formed in the four corners. By inserting bolts 75 respectively through the attachment holes 71a at the four corners and threading the bolts into weld nuts 76 of the top part 32b, the lower support bracket 71 is attached to the top part 32b by the four bolts 75.

Figure 9:
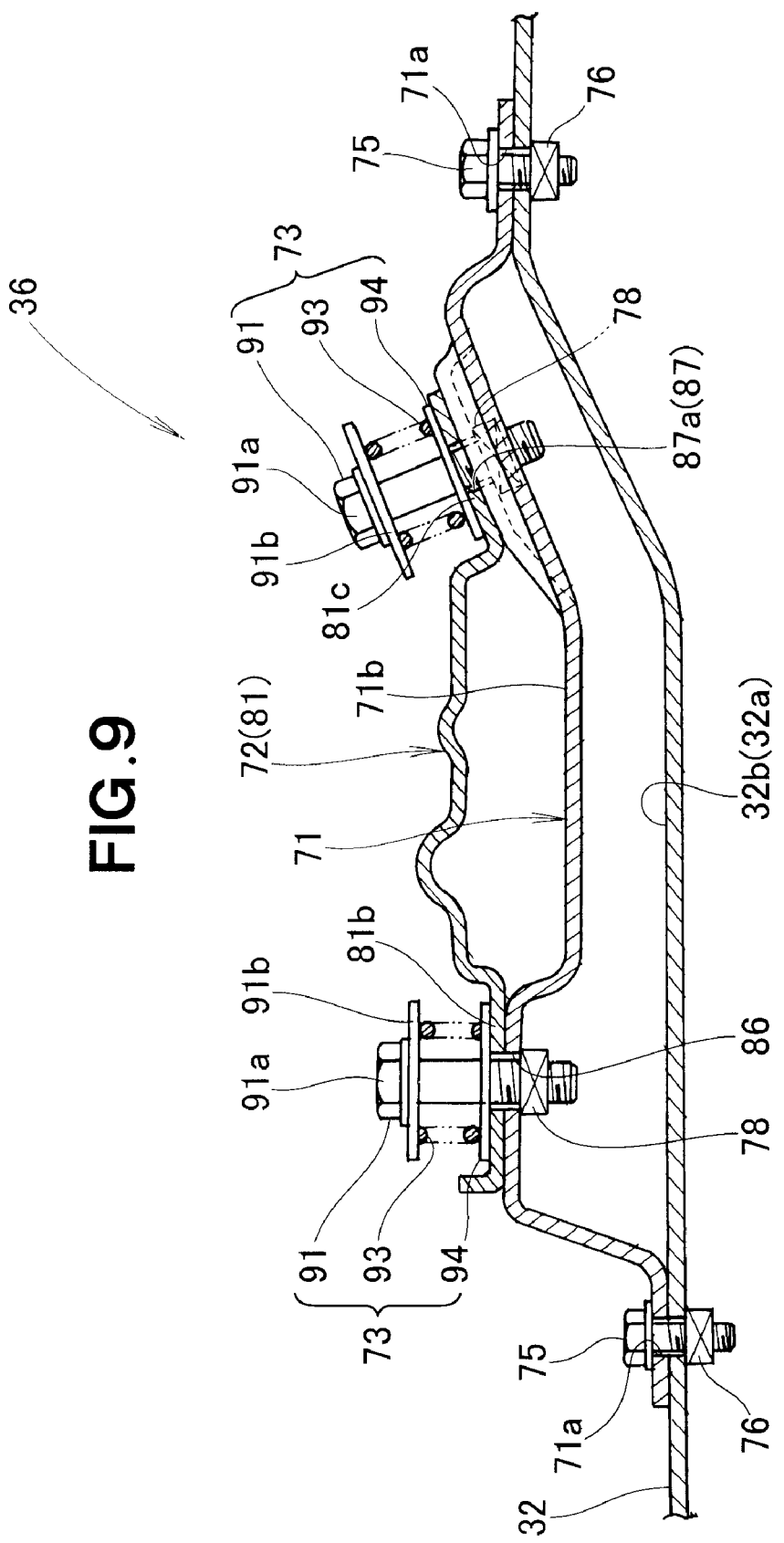
FIG. 9 is an enlarged cross-sectional view taken along line 9-9 of FIG. 4.

In this state, a bracket main body 71b of the lower support bracket 71 is disposed in a state of being raised above the top part 32b of the lower beam 32, as shown in FIG. 9. The bracket main body 71b has a weld nut 78 welded to a vehicle-widthwise inner side part 71c, and a weld nut 78 welded to a vehicle-widthwise outer side part 71d. The weld nut 78 of the vehicle-widthwise inner side part 71c and the weld nut 78 of the vehicle-widthwise outer side part 71d are positioned so as to be a predetermined gap L2 apart from each other in the vehicle width direction.

The lower movement bracket 72 is disposed above the lower support bracket 71 and along the lower support bracket 71. The lower movement bracket 72 has a lower support part 81 for supporting a left bottom part 17b of the radiator 17 and a left bottom part 18b of the condenser 18, and a lower contact part 82 extending toward the front of the vehicle body from the lower support part 81, as shown in FIG. 2.

The lower support part 81 is a substantially rectangular region disposed above the lower support bracket 71 and along the lower support bracket 71. In the lower support part 81, a bottom radiator support part 84 is provided to a rear end 81a, a bottom condenser support part 85 is provided toward the front of the vehicle body from the bottom radiator support part 84, a slit 86 is formed in a vehicle-widthwise inner side part 81b, and a rear half part 87a of a slot 87 is formed in an outer side part 81c.

The bottom radiator support part 84 supports the left bottom part 17b by fitting with the left bottom part 17b of the radiator 17, as shown in FIG. 2. The bottom condenser support part 85 supports the left bottom part 18b by fitting with the left bottom part 18b of the condenser 18. Specifically, the lower movement bracket 72 is a member which supports the left bottom part 16c of the cooling system component 16 by being provided to the left bottom part 16c of the cooling system component 16.

The slit 86 is provided to the vehicle-widthwise inner side part 81b which is a region facing the weld nut 78 provided to the vehicle-widthwise inner side part 71c of the lower support bracket 71. The slit 86 is a guide groove formed so as to open toward the front of the vehicle body, having an opening 86a in the front end. The lower movement bracket 72 is capable of moving toward the rear of the vehicle body along a bottom fastening bolt 91 passed through the slit 86. The bottom fastening bolt 91 is removed from the slit 86 by passing the bottom fastening bolt 91 out of the opening 86a of the slit 86.

The slot 87 extends in the forward-backward direction of the vehicle body. The rear half part 87a of the slot 87 is a region that faces the weld nut 78 provided to the vehicle-widthwise outer side part 71d of the lower support bracket 71.

The lower contact part 82 is a protruding piece extending substantially horizontally toward the front of the vehicle body from the front portion of the lower support part 81, wherein a front half part 87b of the slot 87 is formed in an outer side part 82a, and a front end 82b is bent upward.

The front half part 87b of the slot 87 extends in a straight line toward the front of the vehicle body from the rear half part 87a of the slot 87. The slot 87 is formed from the front half part 87b and the rear half part 87a. The slot 87 is a long guiding hole extending in a straight line in the vehicle forward-backward direction. The lower support part 81 is capable of moving toward the rear of the vehicle body along the bottom fastening bolt 91 passed through the slot 87. The slot 87 and the slit 86 are formed at a predetermined gap L2 from each other in the vehicle width direction.

Due to the lower contact part 82 protruding from the front of the lower support part 81, the impact load during a light collision is made to act on the front end 82b of the lower contact part 82 from the rear of the vehicle body toward the front of the vehicle body. The lower movement bracket 72 is fastened to the lower support bracket 71 by the pair of bottom fastening means 73.

One of the pair of bottom fastening means 73 is provided to the vehicle-widthwise outer side so as to correspond to the slot hole, and the other bottom fastening means 73 is provided to the vehicle-widthwise inner side so as to correspond to the slit 86.

The one bottom fastening means 73 comprises a bottom fastening bolt (a bottom fastening member) 91 for fastening the lower movement bracket 72 to the lower support bracket 71, a first washer 92 through which the bottom fastening bolt is inserted, a bottom spring member (a bottom resilient member) 93, and a second washer 94. For the bottom fastening bolt 91, a bolt commonly known as a "flange bolt" may be used, in which a head 91a of the bottom fastening bolt 91 and the first washer 92 are integrated.

Since the other bottom fastening means 73 is a structural member identical to the one bottom fastening means 73, the structural members thereof are denoted by the same symbols as the one bottom fastening means 73, and detailed descriptions thereof are omitted.

As shown in FIGS. 8 and 9, in a state in the one bottom fastening means 73 in which the first washer 92, the bottom spring member 93, and the second washer 94 are fitted over the bottom fastening bolt 91, the bottom fastening bolt 91 is passed through the slot 87 and threaded through the weld nut 78. The bottom spring member 93 is a compression spring.

In this state, the first washer 92 is brought in contact with the head 91a of the bottom fastening bolt 91, the second washer 94 is brought in contact with the outer side part 81c of the lower support part 81, and the bottom spring member 93 is compressed and fitted in between the first washer 92 and the second washer 94. In other words, the bottom spring member 93 is fitted in between the head 91a of the bottom fastening bolt 91 and the outer side part 81c of the lower support part 81 while being compressed via the first washer 92 and the second washer 94.

In a state in the other bottom fastening means 73 in which the first washer 92, the bottom spring member 93, and the second washer 94 are fitted over the bottom fastening bolt 91, the bottom fastening bolt 91 is passed through the slit 86 and threaded through the other weld nut 78 (the one on the vehicle-widthwise inner side).

In the other bottom fastening means 73, similar to the one bottom fastening means 73, the second washer 94 is brought in contact with the vehicle-widthwise inner side part 81b of the lower support part 81, and the bottom spring member 93 is compressed and fitted in between the first washer 92 and the second washer 94. In other words, the bottom spring member 93 of the other bottom fastening means 73 is fitted in between the head 91a of the bottom fastening bolt 91 and the vehicle-widthwise inner side part 81b of the lower support part 81 while being compressed via the first washer 92 and the second washer 94.

Thus, the one bottom fastening means 73 is provided to the outer side part 81c of the lower movement bracket 72 and the other bottom fastening means 73 is provided to the vehicle-widthwise inner side part 81b of the lower movement bracket 72, whereby the pair of bottom fastening means 73 are provided to both vehicle-widthwise sides of the lower movement bracket 72.

In this state, a bottom fastening bolt 91 is passed through the slit 86 and a bottom fastening bolt 91 is passed through the slot 87, whereby the lower movement bracket 72 is fastened to the lower support bracket 71 by the pair of bottom fastening means 73 so as to be free to move toward the rear of the vehicle body. The left bottom part 16c (FIG. 2) of the cooling system component 16 is thereby provided to the lower beam 32 (the top part 32b) via the left bottom support mechanism 36 so as to be free to move toward the rear of the vehicle body.

As described above, the slot 87 extends in the forward-backward direction of the vehicle body. When the lower movement bracket 72 is moved (slid) toward the rear of the vehicle body, the slot 87 can be moved along the bottom fastening bolt 91.

By providing the bottom fastening means 73 to the respective vehicle-widthwise sides of the lower movement bracket 72, the pair of bottom fastening means 73 can be provided to the substantial center of the lower movement bracket 72 in the vehicle forward-backward direction. Consequently, there is no need to greatly expand the shape of the lower movement bracket 72 toward the rear of the vehicle body, and the lower movement bracket 72 can be reduced in size.

Thus, by reducing the size of the lower movement bracket 72 and stably sliding the lower movement bracket 72 in the desired direction (toward the rear of the vehicle body), the protruding direction and protruding amount of the lower movement bracket 72 toward the rear of the vehicle body can be suitably controlled.

Furthermore, by fitting the bottom spring member 93 between the lower movement bracket 72 and the head 91a of the bottom fastening bolt 91, the fastening load of the bottom fastening bolt 91 can be suitably adjusted by the bottom spring member 93. It is thereby easy to manage the load when the slit 86 of the lower movement bracket 72 is removed from the bottom fastening bolt 91 (i.e. the "withdrawal load"), and a satisfactory performance quality can be preserved.

Furthermore, it is easy to manage the load when the slot 87 of the lower movement bracket 72 is moved along the bottom fastening bolt 91 (i.e. the "movement load"), and a satisfactory performance quality can be preserved.

According to the vehicle body front structure 10, the left top support mechanism 35 is provided to the upper beam 33, and the left top part 16a (FIGS. 2 and 3) of the cooling system component 16 can be supported by the left top support mechanism 35 can be moved toward the rear of the vehicle body, as shown in FIG. 4. The left bottom support mechanism 36 is provided to the lower beam 32, and the left bottom part 16c (FIG. 2) of the cooling system component 16 can be supported by the left bottom support mechanism 36 and moved toward the rear of the vehicle body. Consequently, when an impact load acts on the left top support mechanism 35 and the left bottom support mechanism 36 from the front of the vehicle body, the cooling system component 16 can be moved toward the rear of the vehicle body by the support mechanisms 35, 36. Thereby, the cooling system component 16 can be moved toward the rear of the vehicle body to prevent damage to the cooling system component 16 by the impact load.

Furthermore, the cooling system component 16 can be moved toward the rear of the vehicle body by the left top support mechanism 35 of the upper beam 33 and the left bottom support mechanism 36 of the lower beam 32, whereby there is no need to move the upper beam or the lower beam toward the rear of the vehicle body. Thus, since there is no need to move the upper beam 33 or the lower beam 32 toward the rear of the vehicle body, the upper beam 33 and the lower beam 32 can be provided integrally and firmly to ensure rigidity in the bulkhead 15. It is thereby possible to ensure rigidity in the vehicle body front structure 10 with the bulkhead 15, and the vehicle body front structure 10 can be adapted to various power units (e.g. engine transmission units).

Figure 10:
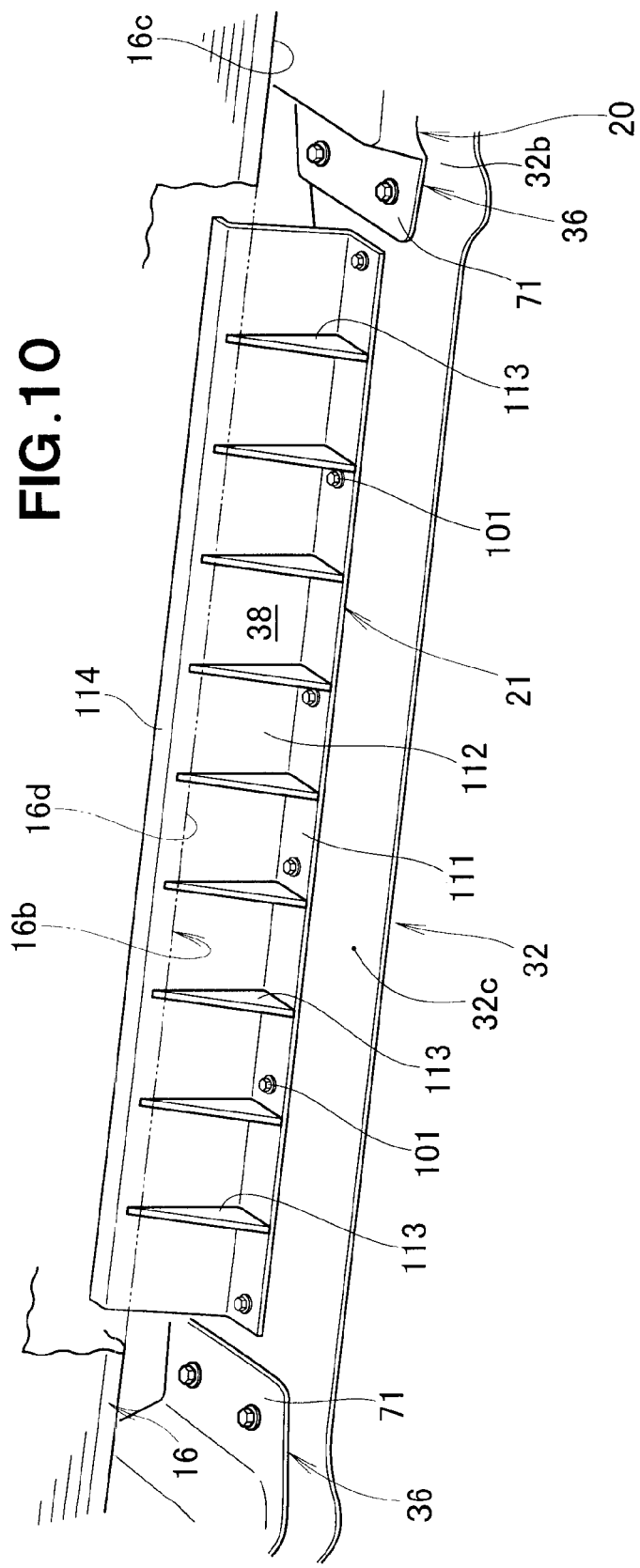
FIG. 10 is a perspective view showing on an enlarged scale a wall member of FIG. 1.

The wall member 21 is disposed within the cooling system support unit 20 (specifically, between the lower support bracket 71 of the left bottom support mechanism 36 and the lower support bracket 71 of the right bottom support mechanism 36), as shown in FIG. 10.

The wall member 21 is disposed in a space 38 between the lower beam 32 and a center bottom part 16d in the bottom part 16b of the cooling system component 16, and is provided to the lower beam 32 by a plurality of bolts 101 and nuts 102 (FIG. 12).

In the embodiment, the bolts 101 and nuts 102 are presented as examples of fastening means for attaching the wall member 21 to the lower beam 32, but grips or the like can also be used as other fastening means. Operability can be further improved by using grips as the fastening means, and cost can be suppressed to keep price low.

The space 38 is formed between the lower beam 32 and the bottom part 16b of the cooling system component 16 so as to avoid the left and right bottom support mechanisms 36.

The bottom part 16b of the cooling system component 16 is comprised of the left bottom part 16c, a right bottom part, and the center bottom part 16d. The left bottom part 16c is a region supported by the left bottom support mechanism 36, and the right bottom part is a region supported by the right bottom support mechanism 36.

Figure 11:
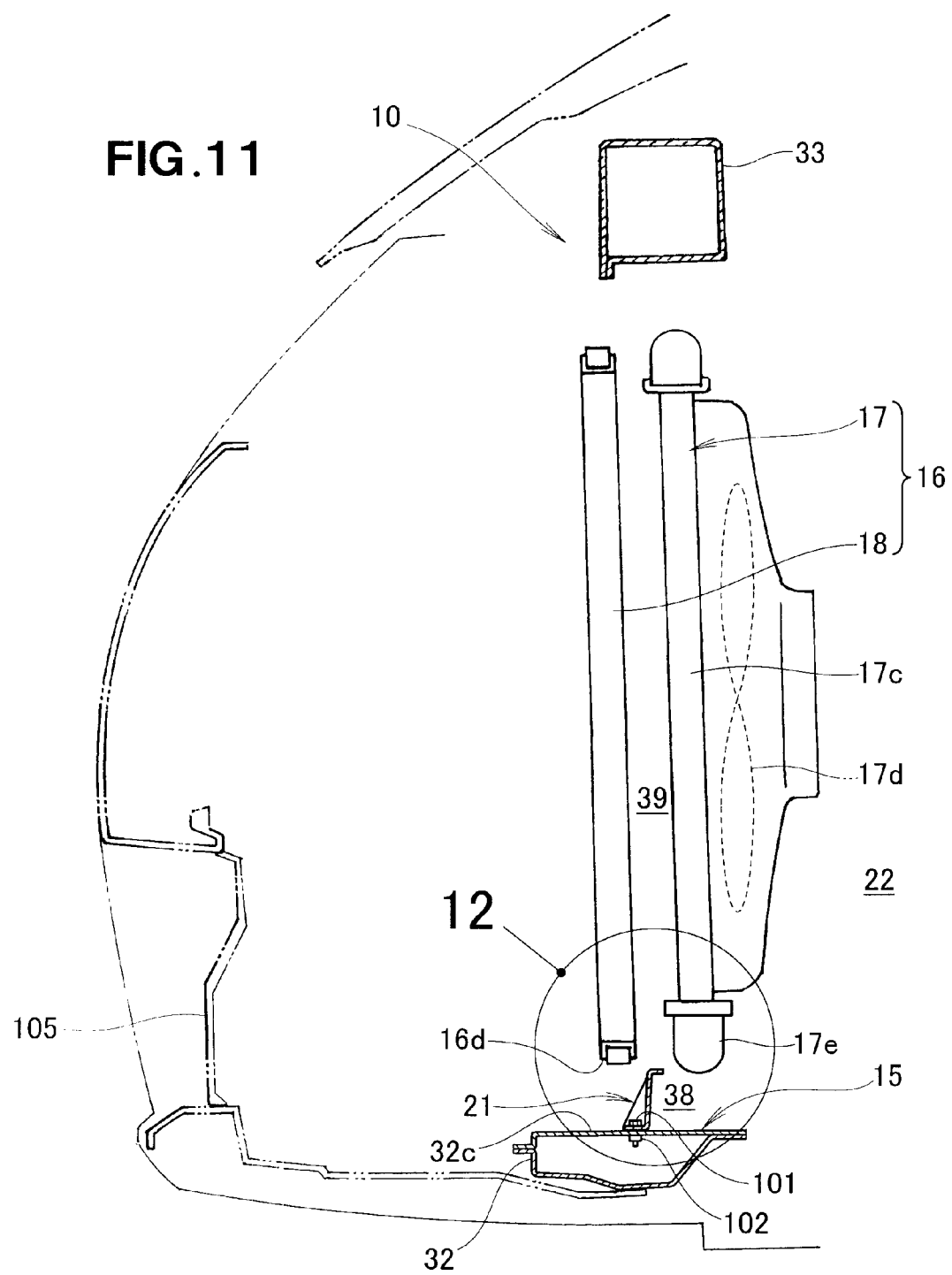
FIG. 11 is a cross-sectional view taken along line 11-11 of FIG. 1.

The wall member 21 disposed in the space 38 faces a grill opening 105 disposed forward in the vehicle body from the wall member 21, as shown in FIG. 11. The grill opening 105 is an opening for leading air form the front of the vehicle body into the engine compartment 22 when the vehicle is traveling.

As shown in FIGS. 10 and 12, the wall member 21 has an attachment seat 111 attached to the lower beam 32, a wall panel 112 standing upright from the attachment seat 111 and partitioning the space 38 to the front and rear, substantially triangular reinforcing ribs 113 connecting the wall panel 112 and the attachment seat 111, and a protruding piece 114 protruding from a top end 112a of the wall panel 112 toward the radiator 17 rearward in the vehicle body.

The attachment seat 111 is disposed in the vehicle width direction along a center top part 32c of the lower beam 32, and is attached to the center top part 32c by the bolts 101 and nuts 102. The attachment seat 111 is disposed between the lower support bracket 71 of the left bottom support mechanism 36 and the lower support bracket 71 of the right bottom support mechanism 36.

The wall panel 112 is stood upright, rising vertically upward from a rear end 111a of the attachment seat 111, and is provided between the condenser 18 and the radiator 17. The wall panel 112 stands upright between the condenser 18 and the radiator 17, whereby the wall member 21 is provided between the condenser 18 and the radiator 17. Consequently, the space 38 is partitioned to the front and rear by the wall panel 112.

The wall panel 112 is disposed in a position separated from the condenser 18 by a distance L3 toward the rear of the vehicle body. Specifically, the wall member 21 is disposed in a position separated from the condenser 18 toward the rear of the vehicle body.

Furthermore, the wall panel 112 is disposed in a position separated from the radiator 17 by a distance L4 toward the front of the vehicle body. Specifically, the wall member 21 is disposed in a position separated from the radiator 17 toward the front of the vehicle body.

Thus, the wall member 21 is provided between the condenser 18 and the radiator 17 in the forward-backward direction of the vehicle body, whereby the wall member 21 is disposed in a position separated from the cooling system component 16 in the forward-backward direction of the vehicle body.

The condenser 18 is supported by the elastically deformable top and bottom condenser support parts 62, 85 (FIG. 2). The radiator 17 is supported by the elastically deformable top and bottom radiator support parts 61, 84 (FIG. 2). Consequently, the cooling system component 16 (the condenser 18 and the radiator 17) is believed to vibrate up and down due to traveling vibration of the vehicle and interfere with the wall panel 112.

In view of this, the wall panel 112 is disposed in a position separated from the condenser 18 and the radiator 17 in the forward-backward direction of the vehicle body (an offset position). Thereby, when the cooling system component 16 (the condenser 18 and the radiator 17) vibrates up and down due to the traveling vibration of the vehicle, the condenser 18 and the radiator 17 can be prevented from interfering with the wall panel 112 (the wall member 21).

Furthermore, the cooling system component 16 (the condenser 18 and the radiator 17) is believed to shake (vibrate) forward and backward and interfere with the wall panel 112 when the vehicle is accelerating or stopping.

In view of this, the wall panel 112 is disposed separated from the condenser 18 and the radiator 17 in the forward-backward direction of the vehicle body, whereby the cooling system component 16 shaking (vibrating) forward and backward is prevented from interfering with the wall panel 112.

Particularly, a bottom part 17e of the radiator 17 of the cooling system component 16 extends below the top end 112a of the wall panel 112. Consequently, by separating the wall panel 112 from the radiator 17 by a distance L4 toward the front of the vehicle body, the bottom part 17e of the radiator 17 can be prevented from interfering with the wall panel 112.

Additionally, the wall member 21 is provided between the condenser 18 and the radiator 17. Consequently, the condenser 18 is disposed toward the front of the vehicle body from the wall member 21, and the radiator 17 is disposed toward the rear of the vehicle body from the wall member 21. Thereby, only a bottom part 18c of the condenser 18 disposed toward the front of the vehicle body from the wall member 21 is disposed higher than the wall member 21 by a distance H2, and the condenser 18 and radiator 17 can thereby be moved toward the rear of the vehicle body without interfering with the wall member 21.

Specifically, the radiator 17 is provided toward the rear of the vehicle body from the wall member 21. Consequently, even if the bottom part 17e of the radiator 17 is extended below the wall member 21, the bottom part 17e of the radiator 17 can be moved rearward in the vehicle body without interfering with the wall member 21. The radiator 17 can thereby be formed into any desired shape, and the design can have a greater degree of freedom.

Thus, by disposing only the bottom part 18c of the condenser 18 above the wall member 21, the condenser 18 and the radiator 17 can be moved toward the rear of the vehicle body. Thereby, when some obstacle or the like collides lightly with the front of the vehicle body, for example, the condenser 18 and the radiator 17 are moved toward the rear of the vehicle body and the condenser 18 and the radiator 17 are prevented from being damaged by the impact load.

Additionally, the wall panel 112 is disposed in the space 38 between the lower beam 32 and the center bottom part 16d of the cooling system component 16, and the space 38 is partitioned front to rear by the wall panel 112. The wall panel 112 (i.e. the wall member 21) is provided so as to face the grill opening 105 as shown in FIG. 11. Consequently, air led in from the grill opening 105 toward the space 38 is guided (raised) toward the cooling system component 16 by the wall panel 112 (the wall member 21). Thereby, air led in from the grill opening 105 can be efficiently led to the cooling system component 16 (the condenser 18 and the radiator 17), and the cooling performance of the cooling system component 16 can be ensured.

Since the cooling fan 17d of the radiator 17 rotates while the vehicle is travelling, air led into the vehicle from the grill opening 105 is led to the condenser 18 and the radiator 17. It is believed that most of the air passing through the condenser 18 and the radiator 17 flows to the rear of the engine compartment 22, and some of the air flows so as to return from the bottom part 17e of the radiator 17 to the wall panel 112.

Therefore, when the wall panel 112 is provided forward in the vehicle body from the condenser 18, the air returning from the bottom part 17e of the radiator 17 to the wall panel 112 is believed to flow into a space 39 between the condenser 18 and the radiator 17. Due to the air returning from the bottom part 17e of the radiator 17 and flowing into the space 39, it is difficult to ensure the cooling performance of the condenser 18 and the radiator 17.

When the wall panel 112 is provided rearward in the vehicle body from the radiator 17, the wall panel 112 becomes too far distanced rearward in the vehicle body from the condenser 18. Consequently, it becomes difficult for air led in from the grill opening 105 toward the space 38 to be led toward the condenser 18 by the wall panel 112, and it becomes difficult to ensure the cooling performance of the condenser 18 and the radiator 17.

In view of this, the wall panel 112 (the wall member 21) is provided between the condenser 18 and the radiator 17. Consequently, air returning to the wall panel 112 from the bottom part 17e of the radiator 17 can be prevented from flowing into the space 39 between the condenser 18 and the radiator 17, and air led in from the grill opening 105 can be led to the condenser 18 by the wall panel 112. The cooling performance of the condenser 18 and the radiator 17 can thereby be ensured.

As shown in FIGS. 10 and 12, a plurality of reinforcing ribs 113 are provided at predetermined intervals in the vehicle width direction, and are formed into substantially triangular shapes with bottom sides 113a, vertical sides 113b, and inclined sides 113c. The bottom sides 113a extend toward the rear of the vehicle body from the front end 111b of the front side frames 11 to the rear end 111a. The vertical sides 113b extend upward from the rear end 111a of the attachment seat 111 to the top end 112a of the wall panel 112. The inclined sides 113c extend at a downward slope from the top end 112a of the wall panel 112 to the front end 111b of the attachment seat 111.

By connecting the wall panel 112 and the attachment seat 111 by the reinforcing ribs 113, the wall panel 112 can be reinforced by the reinforcing ribs 113, improving the rigidity (strength) of the wall panel 112. The wall panel 112 can thereby be prevented from being tilted toward the rear of the vehicle body by the air led in from the grill opening 105 while the vehicle is traveling.

By forming the reinforcing ribs 113 into substantially triangular shapes, the sides facing the bottom part 18c of the condenser 18 can be formed into the inclined sides 113c. Consequently, the inclined sides 113c can be distanced far below the bottom part 18c of the condenser 18, and a large distance H1 can be ensured between the inclined sides 113c and the bottom part 18c of the condenser 18. The top end 112a of the wall panel 112 (specifically, the protruding piece 114) is disposed below the bottom part 18c of the condenser 18 by a distance H2.

The top end 112a (the protruding piece 114) of the wall panel 112 is provided between the condenser 18 and the radiator 17 in the forward-backward direction of the vehicle body. Specifically, the top end 112a (the protruding piece 114) is disposed in a position (an offset position) distanced from the cooling system component 16 in the forward-backward direction of the vehicle body. Consequently, the condenser 18 and the radiator 17 do not interfere with the top end 112a (the protruding piece 114) even when the cooling system component 16 (the condenser 18 and the radiator 17) vibrated up and down due to traveling vibration of the vehicle.

As described above, forming the reinforcing ribs 113 into substantially triangular shapes ensures a large distance H1 between the inclined sides 113c and the bottom part 18c of the condenser 18. Consequently, the condenser 18 and the radiator 17 can be prevented from interfering with the inclined sides 113c (the wall member 21) when the cooling system component 16 (the condenser 18 and the radiator 17) vibrates up and down due to traveling vibration of the vehicle.

Thus, when the cooling system component 16 vibrates up and down, the cooling system component 16 is prevented from interfering with the top end 112a (the protruding piece 114) and the inclined sides 113c, whereby the cooling system component 16 can be prevented from interfering with the wall member 21.

The protruding piece 114 protrudes substantially horizontally from the top end 112a of the wall panel 112 toward the radiator 17 which is rearward in the vehicle body. By providing the protruding piece 114 to the top end 112a of the wall panel 112, the rigidity (strength) of the wall panel 112 can be further improved.

After the air led in from the grill opening 105 while the vehicle is traveling has passed through the condenser 18 and the radiator 17, some of the air is believed to flow so as to return from the bottom part 17e of the radiator 17 to the wall panel 112. There is a risk that the air flowing to the wall panel 112 will flow over the top end 112a of the wall panel 112 and return (recirculate) to the front of the wall panel 112.

In view of this, the protruding piece 114 is provided to the top end 112a of the wall panel 112. By providing the protruding piece 114 to the top end 112*a*, the air returned to the wall panel 112 by the protruding piece 114 can be prevented from flowing over the top end 112*a* and returning (recirculating) to the front of the wall panel 112.

Next, the method for manufacturing (procedure for assembling) the vehicle body front structure 10 will be described based on FIGS. 13 through 15.

Figure 13A:
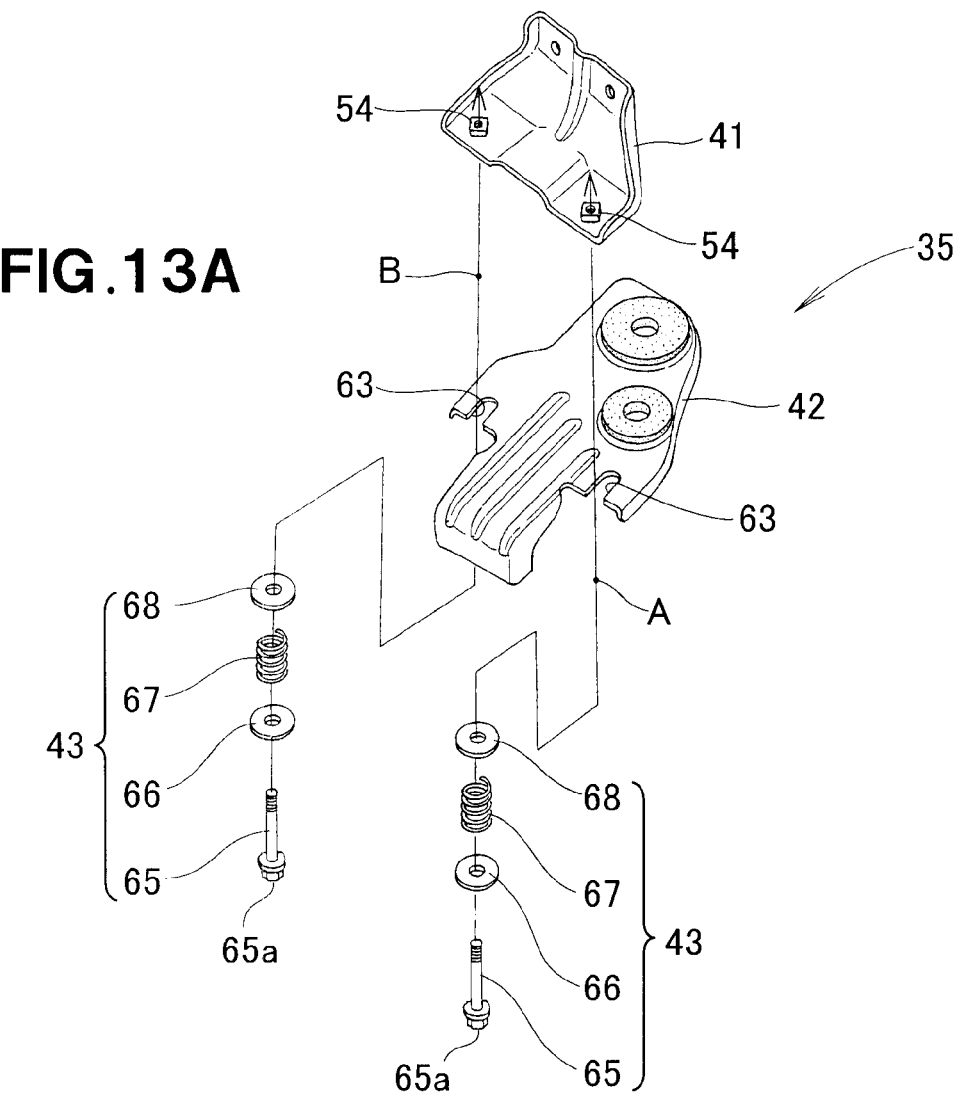
FIGS. 13A and 13B are views showing the procedure of assembling the left top support mechanism of the vehicle body front structure.

As shown in FIG. 13A, a first washer 66, a top spring member 67, and a second washer 68 are fitted over the top fastening bolt 65 of the one top fastening means 43. In this state, the top fastening bolt 65 is passed through one of the slits 63 (the one toward the vehicle body outer side) of the upper movement bracket 42, and is threaded through one of the weld nuts 54 (the one toward the vehicle body outer side) of the upper support bracket 41 as shown by arrow A.

Furthermore, the first washer 66, a top spring member 67, and a second washer 68 are fitted over the top fastening bolt 65 of the other top fastening means 43. In this state, the top fastening bolt 65 is passed through the other slit 63 (the one toward the vehicle body inner side) of the upper movement bracket 42, and is threaded through the other weld nut 54 (the one toward the vehicle body inner side) of the upper support bracket 41 as shown by arrow B.

Figure 13B:
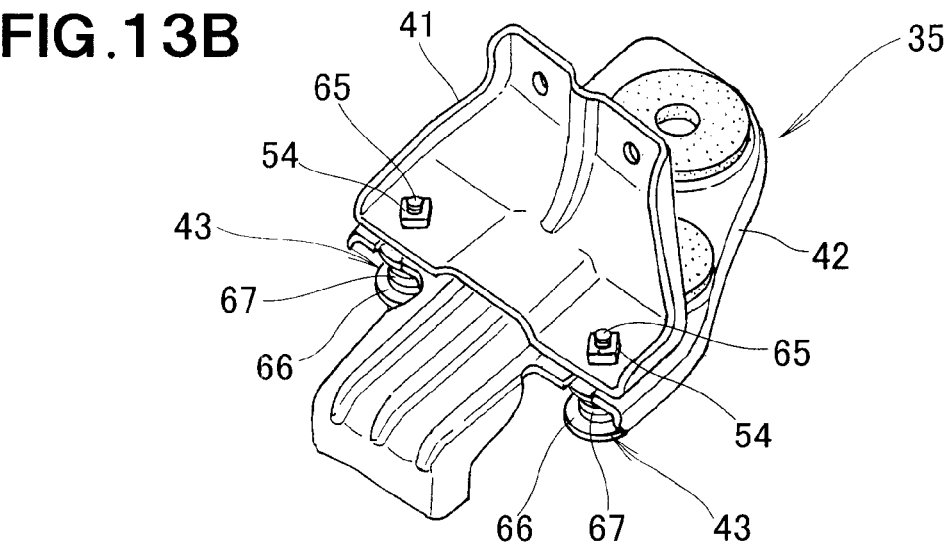

The upper movement bracket 42 is fastened to the upper support bracket 41 by the pair of top fastening means 43 so as to be free to move toward the rear of the vehicle body, as shown by FIG. 13B.

Figure 14A:
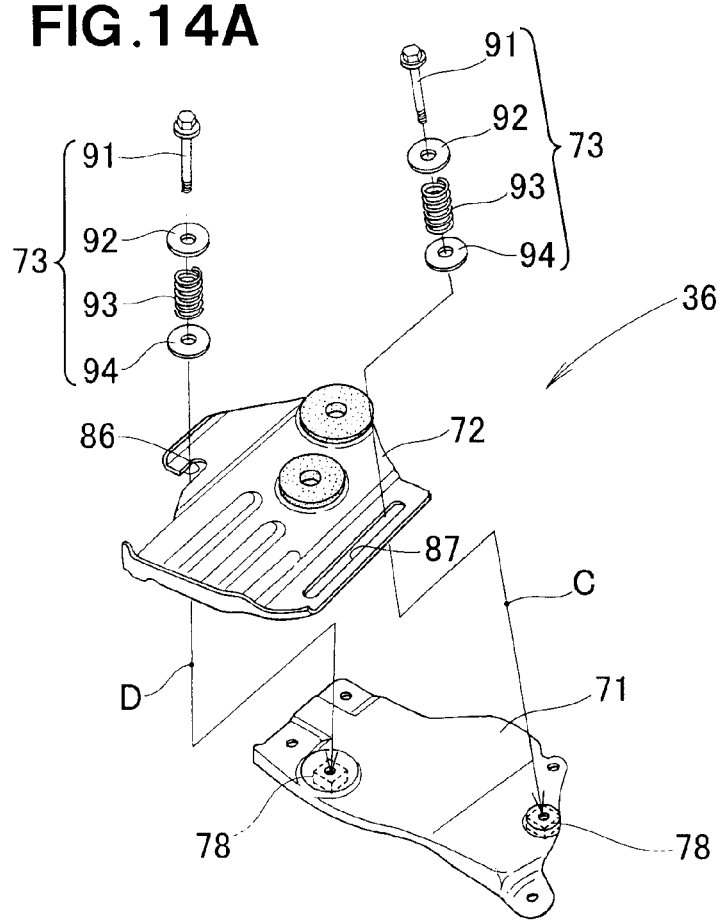
FIGS. 14A and 14B are views showing the procedure of assembling the left bottom support mechanism of the vehicle body front structure.

As shown in FIG. 14A, a first washer 92, a bottom spring member 93, and a second washer 94 are fitted over the bottom fastening bolt 91 of one of the bottom fastening means 73. In this state, the bottom fastening bolt 91 is passed through the slot 87 of the lower movement bracket 72 and threaded through one of the weld nuts 78 (the one toward the vehicle body outer side) of the lower support bracket 71 as shown by arrow C.

Furthermore, a first washer 92, a bottom spring member 93, and a second washer 94 are fitted over the bottom fastening bolt 91 of the other bottom fastening means 73. In this state, the bottom fastening bolt 91 is passed through the slit 86 of the lower movement bracket 72 and threaded through the other weld nut 78 (the one toward the vehicle body inner side) of the lower support bracket 71 as shown by arrow D.

Figure 14B:
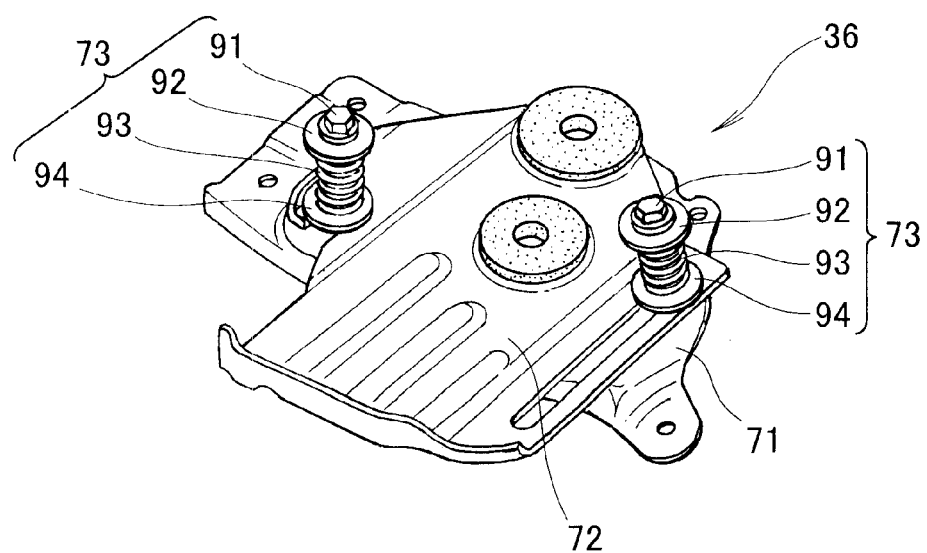

The lower movement bracket 72 is fastened to the lower support bracket 71 by the pair of bottom fastening means 73 so as to be free to move toward the rear of the vehicle body, as shown in FIG. 14B.

Figure 15A:
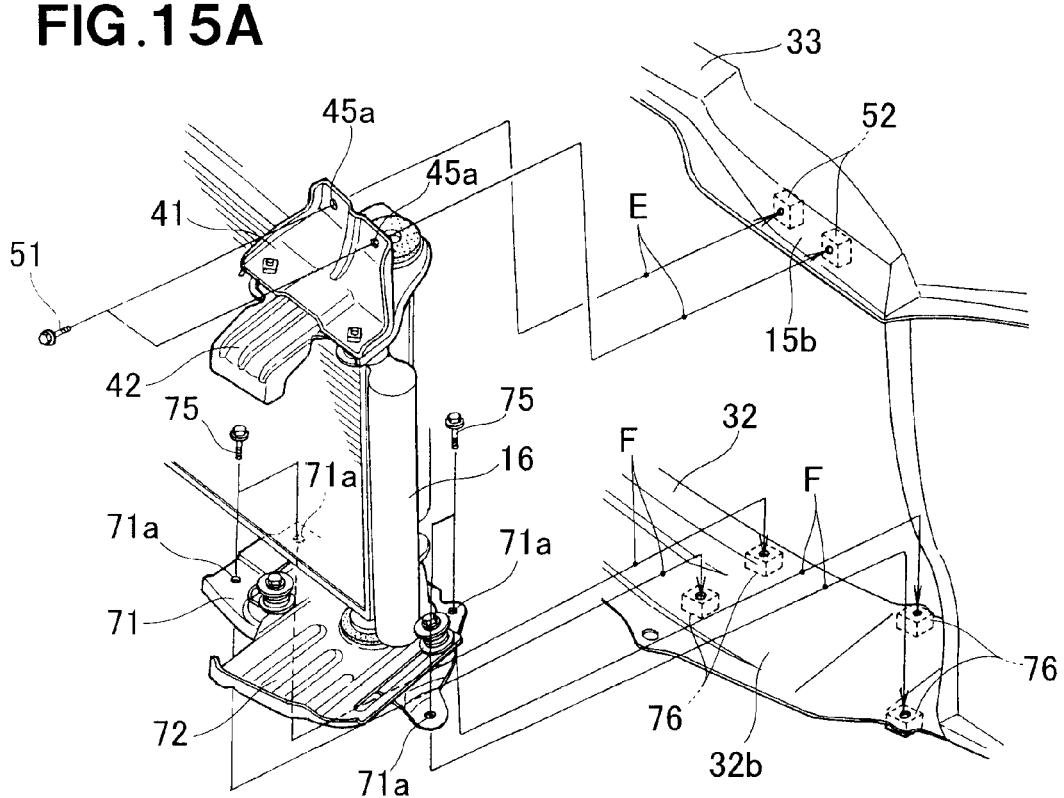
FIGS. 15A and 15B are views showing the procedure of assembling the left top support mechanism and the left bottom support mechanism on a front bulkhead.

As shown in FIG. 15A, with the upper movement bracket 42 having been fastened to the upper support bracket 41, the left top part 16*a* (FIGS. 2 and 3) of the cooling system component 16 is supported on the upper movement bracket 42. Furthermore, with the lower movement bracket 72 having been fastened to the lower support bracket 71, the left bottom part 16*c* (FIG. 2) of the cooling system component 16 is supported on the lower movement bracket 72.

With the left top part 16*a* of the cooling system component 16 supported on the upper movement bracket 42, the bolts 51 are inserted through the pair of attachment holes 45*a* of the upper support bracket 41. The inserted bolts 51 are threaded through the respective weld nuts 52 of the upper beam 33 (the front wall 15*b*).

Furthermore, with the left bottom part 16*c* (FIG. 2) of the cooling system component 16 supported on the lower movement bracket 72, the bolts 75 are inserted through the respective attachment holes 71*a* in the four corners of the lower support bracket 71. The inserted four bolts 75 are threaded through the weld nuts 76 of the lower beam 32 (the top part 32*b*) as shown by arrow F.

Figure 15B:
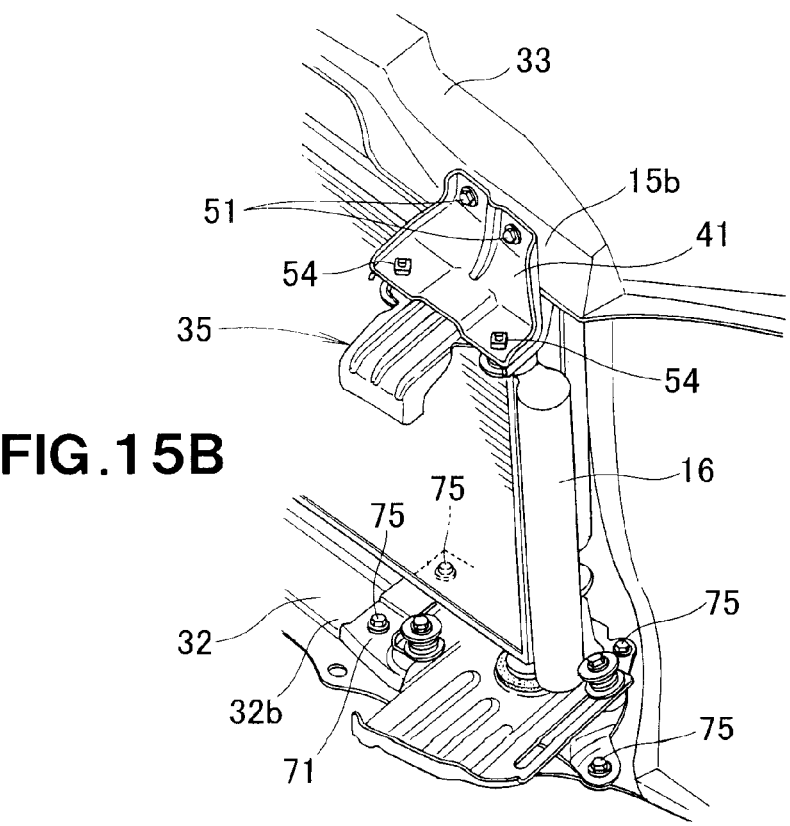

The upper support bracket 41 is attached to the upper beam 33 (the front wall 15*b*) by the pair of bolts 51, as shown in FIG. 15B. The left top part 16*a* (see FIGS. 2 and 3) of the cooling system component 16 are thereby attached to the upper beam 33 (the front wall 15*b*) via the left top support mechanism 35 so as to be free to move toward the rear of the vehicle body.

Furthermore, the lower support bracket 71 is attached to the lower beam 32 (the top part 32*b*) by the four bolts 75. The left bottom part 16*c* (FIG. 2) of the cooling system component 16 is thereby attached to the lower beam 32 (the top part 32*b*) via the left bottom support mechanism 36 so as to be free to move toward the rear of the vehicle body.

Thus, before the upper support bracket 41 is attached to the upper beam 33, the upper movement bracket 42 is fastened to the upper support bracket 41 by the pair of top fastening means 43. Consequently, it is possible to suitably adjust the fastening load (i.e. the withdrawal load) when the upper movement bracket 42 is fastened to the upper support bracket 41 by the pair of top fastening means 43.

Similarly, before the lower support bracket 71 is attached to the lower beam 32, the lower movement bracket 72 is fastened to the lower support bracket 71 by the pair of bottom fastening means 73. Consequently, it is possible to suitably adjust the fastening load (i.e. the movement load) when the lower movement bracket 72 is fastened to the lower support bracket 71 by the pair of bottom fastening means 73.

Thus, by suitably adjusting the fastening load of the top and bottom fastening means 43, 73, it is easy to manage the fastening load, and a satisfactory performance quality can be preserved. Therefore, the cooling system component 16 can be easily attached to the front bulkhead 15 (FIG. 1) via the left top support mechanism 35 and the left bottom support mechanism 36.

The following is a description, made based on FIGS. 16 to 20, of an example in which the left half of the cooling system component 16 is moved toward the rear of the vehicle body when an obstacle 98 collides lightly (an offset collision) with the left front part of the vehicle body front structure 10.

Figure 16A:
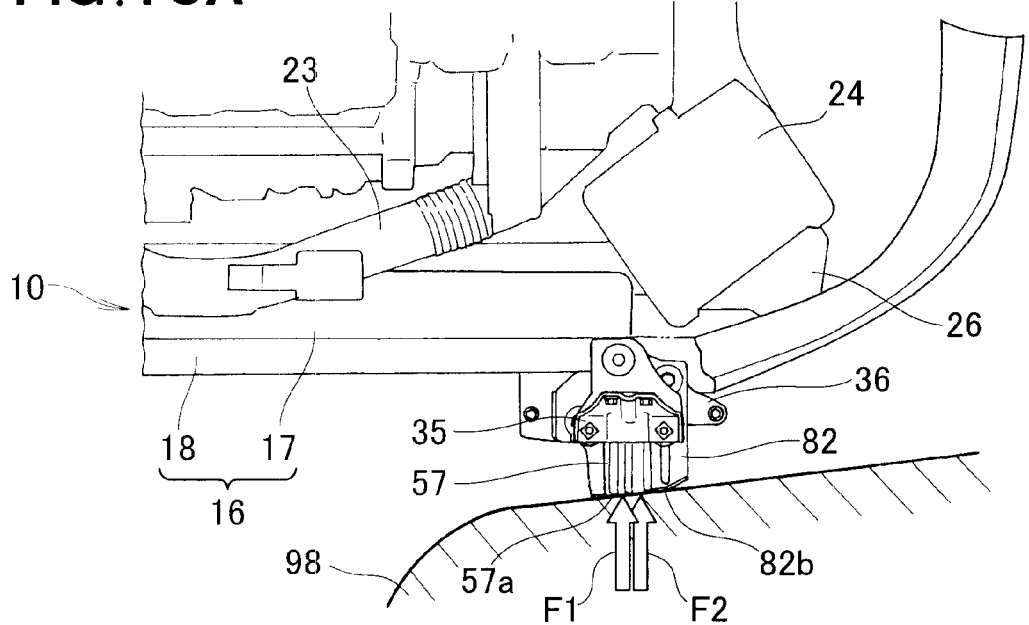
FIGS. 16A and 16B are views showing a state in which an impact load has acted on the left top support mechanism and the left bottom support mechanism.
Figure 16B:
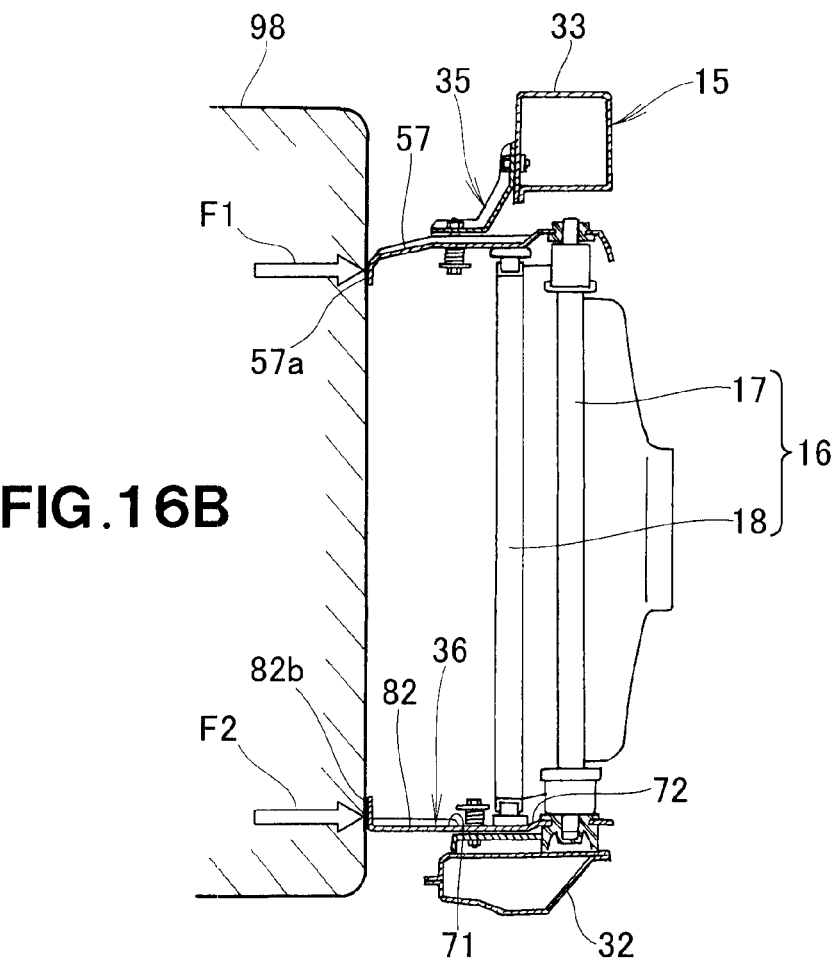

As shown in FIGS. 16A and 16B, when an obstacle 98 has lightly collided with the left front part of the vehicle body front structure 10, an impact load F1 is transferred to the upper contact part 57 (the front end 57*a*) of the left top support mechanism 35 as shown by the arrow. At the same time, an impact load F2 is transferred to the lower contact part 82 (the front end 82*b*) of the left bottom support mechanism 36 as shown by the arrow.

Figure 17A:
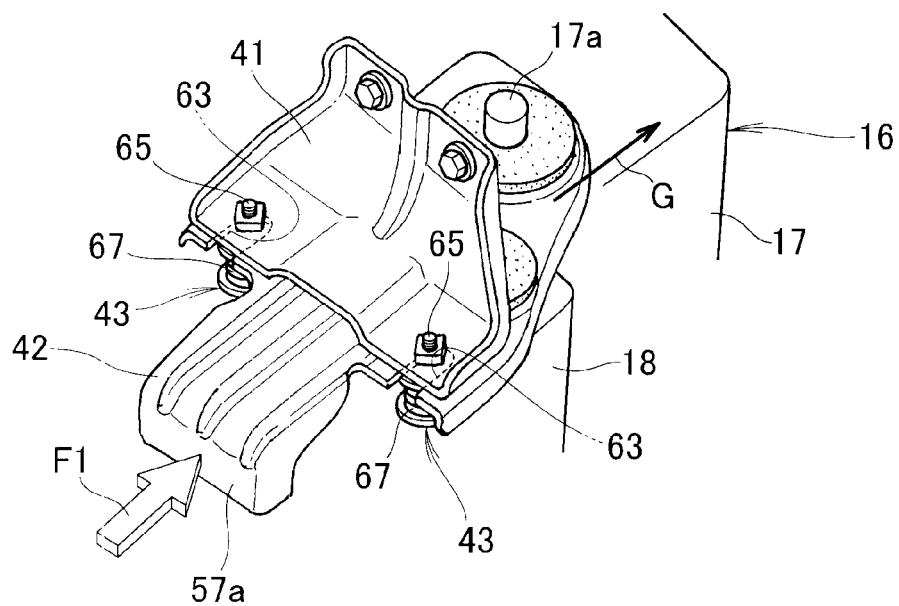
FIGS. 17A and 17B are views showing an example in which the upper movement bracket of the left top support mechanism is caused to slide toward the rear of the vehicle body.
Figure 17B:
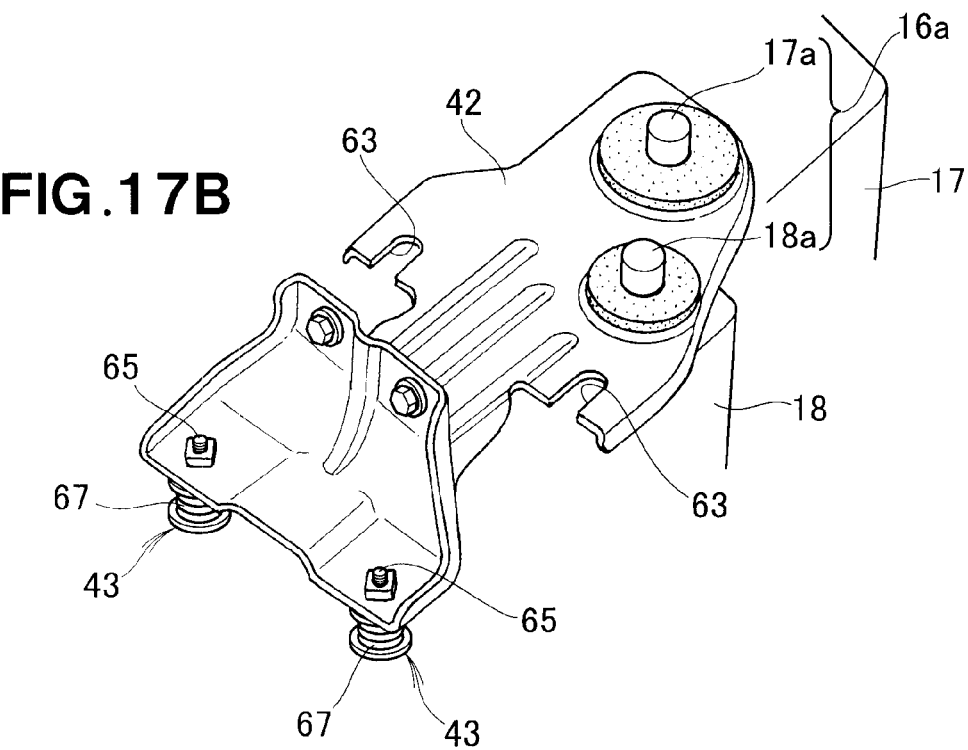

The pair of slits 63 of the upper movement bracket 42 are opened toward the front of the vehicle body as shown in FIGS. 17A and 17B. The top spring members 67 are compressed by the top fastening bolts 65 passed through the slits 63. The upper movement bracket 42 is fastened to the upper support bracket 41 by the pair of top fastening means 43. The impact load F1 is thereby transferred to the front end 57*a* of the upper movement bracket 42, whereby the upper movement bracket 42 moves (slides) toward the rear of the vehicle body as shown by arrow G.

As shown in FIG. 17B, by causing the upper movement bracket 42 to move toward the rear of the vehicle body, one top fastening bolt 65 separates from one slit 63 (the one toward the outer side of the vehicle body), and the other top fastening bolt 65 separates from the other slit 63 (the one toward the inner side of the vehicle body (toward the center of the vehicle body)).

Figure 18A:
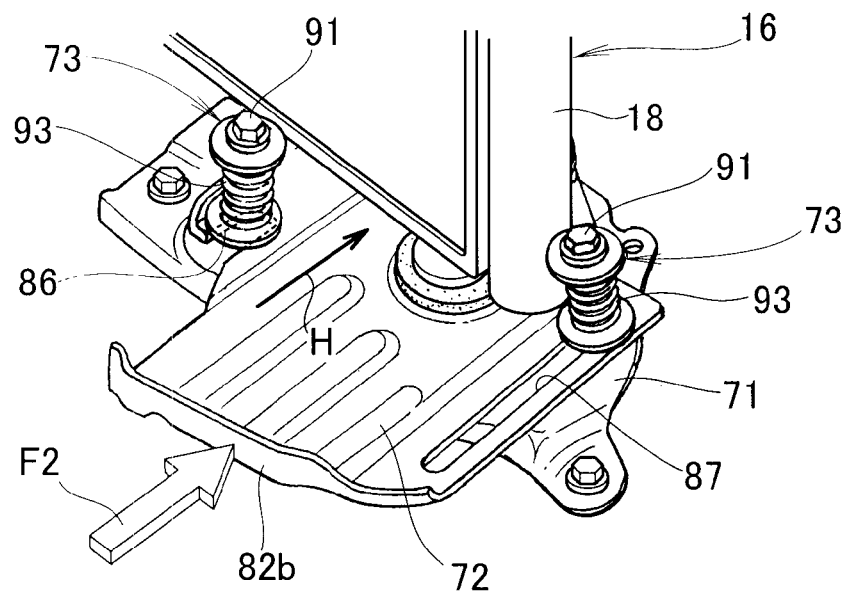
FIGS. 18A and 18B are views showing an example in which the lower movement bracket of the left bottom support mechanism is caused to slide toward the rear of the vehicle body.
Figure 18B:
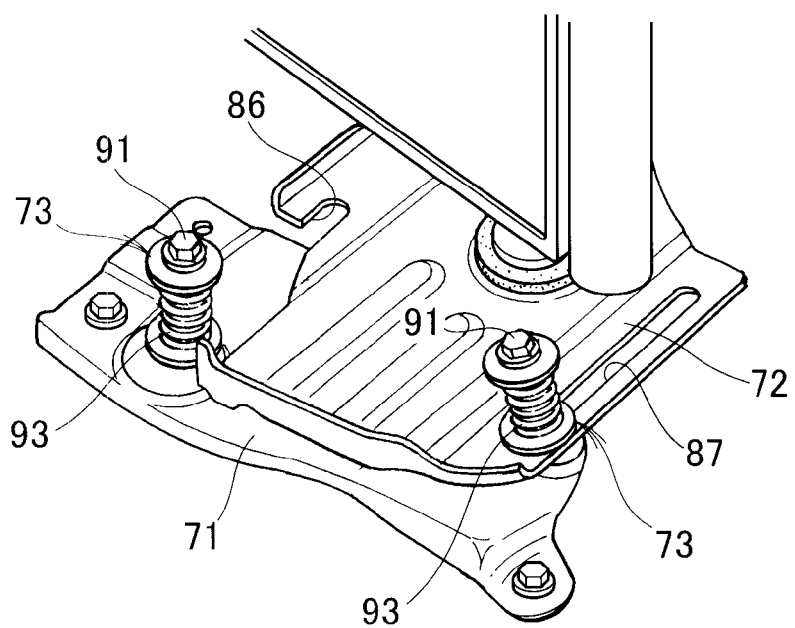

The slot 87 of the lower movement bracket 72 extends in the forward-backward direction of the vehicle body as shown in FIG. 18A. The slit 86 of the lower movement bracket 72 is opened toward the front of the vehicle body (FIG. 18B). One bottom spring member 93 is compressed by the one bottom fastening bolt 91 that is passed through the slot 87. The other bottom spring member 93 is compressed by the other bottom fastening bolt 91 that is passed through the slit 86.

Thus, the lower movement bracket 72 is fastened to the lower support bracket 71 by the pair of bottom fastening means 73. The impact load F2 is thereby transferred to the front end 82b of the lower movement bracket 72, whereby the lower movement bracket 72 moves (slides) toward the rear of the vehicle body as shown by arrow H.

When the lower movement bracket 72 has moved toward the rear of the vehicle body as shown in FIG. 18B, the other bottom fastening bolt 91 is separated from the slit 86, and the one bottom fastening bolt 91 remains passed through the slot 87. Specifically, the lower movement bracket 72 is held by the one bottom fastening bolt 91 so as to not separate from the lower support bracket 71.

Figure 19A:
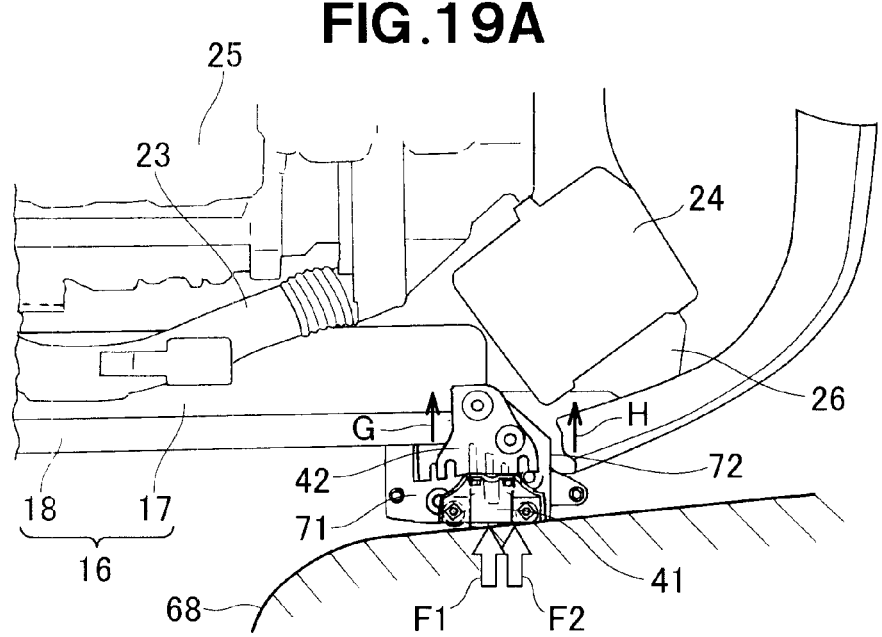
FIGS. 19A and 19B are views showing an example in which the cooling system component is moved toward the rear of the vehicle body by the left top support mechanism and the left bottom support mechanism.
Figure 19B:
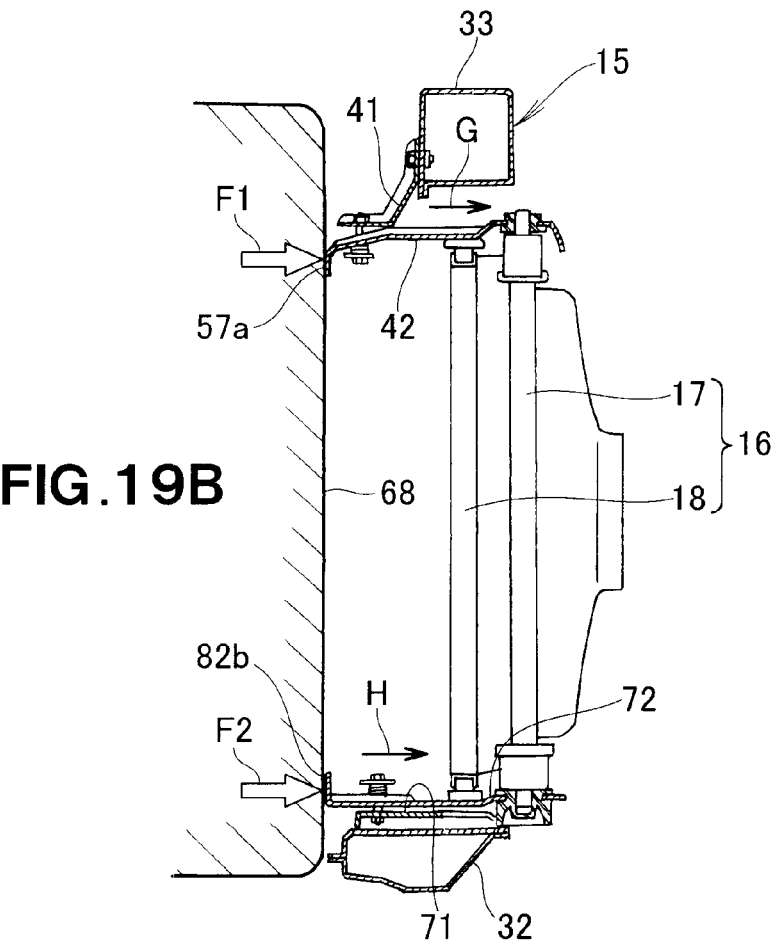

A shown in FIGS. 19A and 19B, by moving (sliding) the upper movement bracket 42 toward the rear of the vehicle body as shown by arrow G, the left top part 16a (FIGS. 2 and 3) of the cooling system component 16 is moved toward the rear of the vehicle body as shown by arrow G. By moving (sliding) the lower movement bracket 72 toward the rear of the vehicle body as shown by arrow H, the left bottom part 16c (FIG. 2) of the cooling system component 16 moves toward the rear of the vehicle body as shown by arrow H. The left half of the cooling system component 16 thereby moves toward the rear of the vehicle body.

As shown in FIGS. 17A and 17B, by moving (sliding) the upper movement bracket 42 toward the rear of the vehicle body as shown by arrow G, the pair of top fastening bolts 65 can be removed from the respective slits 63. The left top part 16a (FIGS. 2 and 3) of the cooling system component 16 can thereby be removed from the upper movement bracket 41, and the restraint on the left top part 16a of the cooling system component 16 can be released.

As shown in FIGS. 18A and 18B, when the lower movement bracket 72 has moved (slid) toward the rear of the vehicle body as shown by arrow H, the lower movement bracket 72 is held by the one bottom fastening bolt 91 so as to not separate from the lower support bracket 71 (the lower beam 32).

Figure 20A:
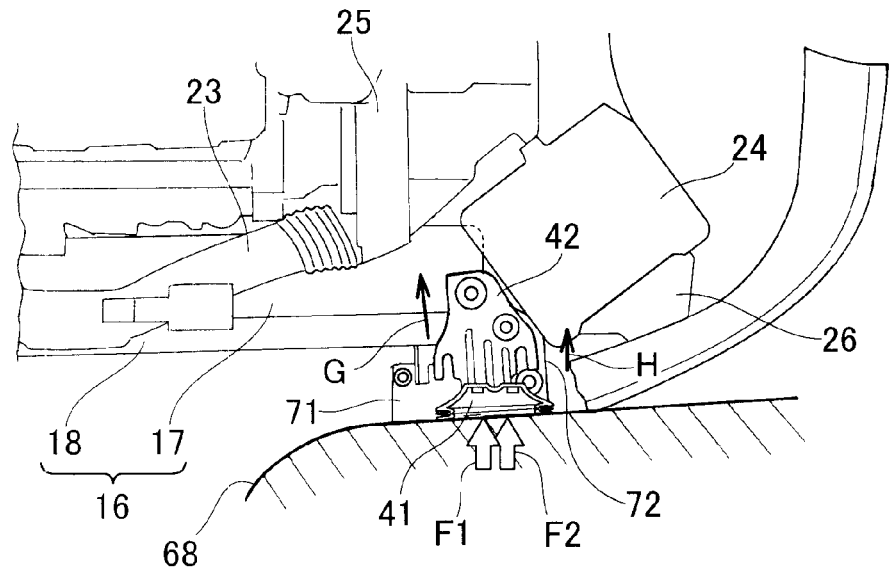
FIGS. 20A and 20B are views showing a state in which the cooling system component 16 has moved toward the rear of the vehicle body.

As shown in FIGS. 20(a) and (b), the cooling system component 16 moves a comparatively large amount toward the rear of the vehicle body about the lower movement bracket 72 (i.e. the left bottom part 16c (FIG. 2) of the cooling system component 16) as a fulcrum, as shown by arrow G. The left top part 16a (FIGS. 2 and 3) of the cooling system component 16 can thereby be satisfactorily prevented from being damaged by the impact load.

Furthermore, the impact load acting on the upper beam 33 is eliminated by removing the upper movement bracket 42 from the upper beam 33 (the upper support bracket 41). The deformation of the upper beam 33 (i.e. the front bulkhead 15) by the impact load can thereby be minimized, and maintenance costs (repair costs) can be reduced.

Furthermore, by keeping the lower movement bracket 72 connected to the lower support bracket 71, the left bottom part 16c (see FIG. 2) of the cooling system component 16 can be stably moved in the desired direction. When the movement of the left bottom part 16c of the cooling system component 16 is complete, the cooling system component 16 is kept from separating from the front bulkhead 15. The cooling system component 16 can thereby be satisfactorily protected and damage to the cooling system component 16 by the impact load can be more satisfactorily prevented.

The top fastening means 43 are provided to the respective vehicle-widthwise sides of the upper movement bracket 42 as shown in FIGS. 17A and 17B. Consequently, the upper movement bracket 42 can be stably moved (slid) in the desired direction (rearward in the vehicle body).

Furthermore, the top fastening means 43 are provided on the vehicle-widthwise sides of the upper movement bracket 42, and the pair of top fastening means 43 are also provided in the substantial center of the upper movement bracket 42 in the forward-backward direction of the vehicle body. Consequently, there is no need for the shape of the upper movement bracket 42 to protrude far toward the rear of the vehicle body, and the upper movement bracket 42 can be reduced in size.

Additionally, as shown in FIGS. 18A and 18B, since the pair of bottom fastening means 73 are provided to the respective vehicle-widthwise sides of the lower movement bracket 72, the lower movement bracket 72 can be stably moved (slid) in the desired direction (toward the rear of the vehicle body).

Furthermore, the pair of bottom fastening means 73 are provided in the substantial center of the lower movement bracket 72 in the forward-backward direction of the vehicle body. Consequently, there is no need for the shape of the lower movement bracket 72 to protrude far toward the rear of the vehicle body, and the lower movement bracket 72 can be reduced in size.

Figure 20B:
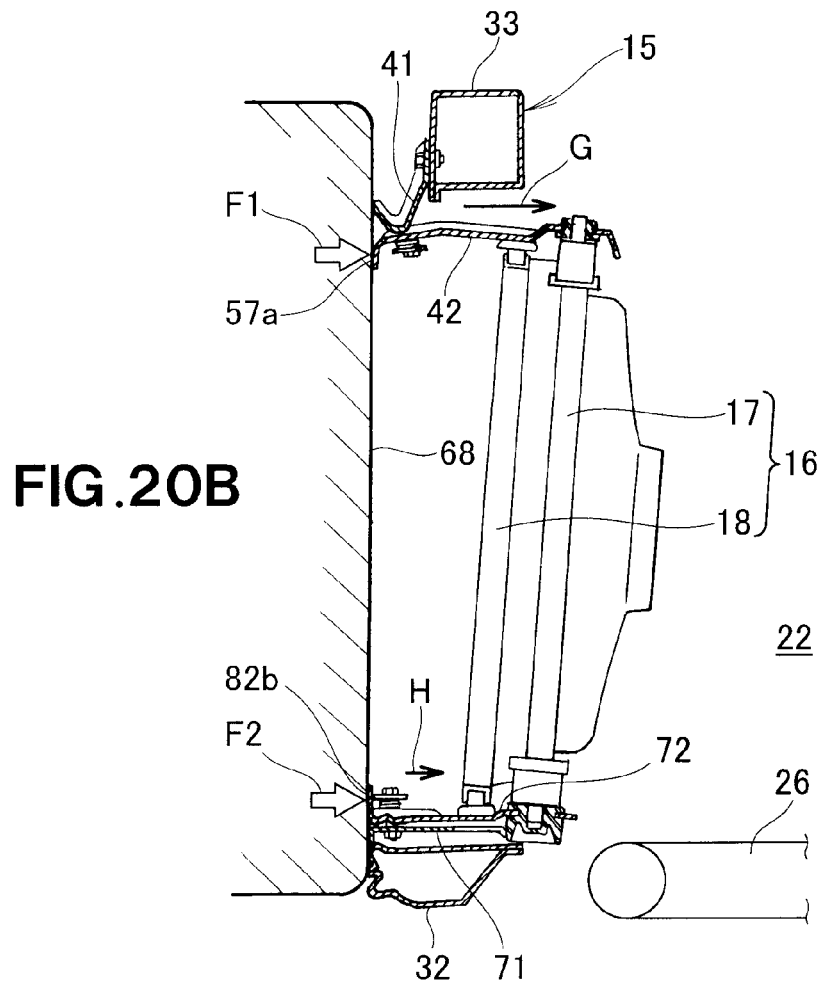

As shown in FIGS. 20A and 20B, by stably sliding the upper movement bracket 42 and the lower movement bracket 72 the desired direction (toward the rear of the vehicle body), the cooling system component 16 can be stably moved toward the rear of the vehicle body.

Furthermore, by reducing the upper movement bracket 42 and the lower movement bracket 72 in size, the protruding direction and protruding amount of the upper movement bracket 42 and the lower movement bracket 72 toward the rear of the vehicle body can be suitably controlled. Thereby, when the cooling system component 16 has been moved toward the rear of the vehicle body as shown in FIG. 20A, it is possible to satisfactorily avoid interference with the battery 24 provided behind the cooling system component 16 by the upper movement bracket 42 and the cooling system component 16.

Furthermore, as shown in FIG. 20B, it is possible to satisfactorily avoid interference with the sub frame 26 provided below the engine compartment 22 by the lower movement bracket 72 and the cooling system component 16.

When the cooling system component 16 has been moved toward the rear of the vehicle body as shown in FIG. 20A, the cooling system component 16 is believed to interfere with the air intake duct 23 provided behind the cooling system component 16. This air intake duct 23 is an elastically deformable member. Consequently, when the cooling system component 16 has interfered with the air intake duct 23, the air intake duct 23 elastically deforms and damage to the cooling system component 16 can be prevented.

Next, an example of the cooling system component 16 being cooled by the air led in while the vehicle is traveling will be described based on FIGS. 21A and 21B.

Figure 21A:
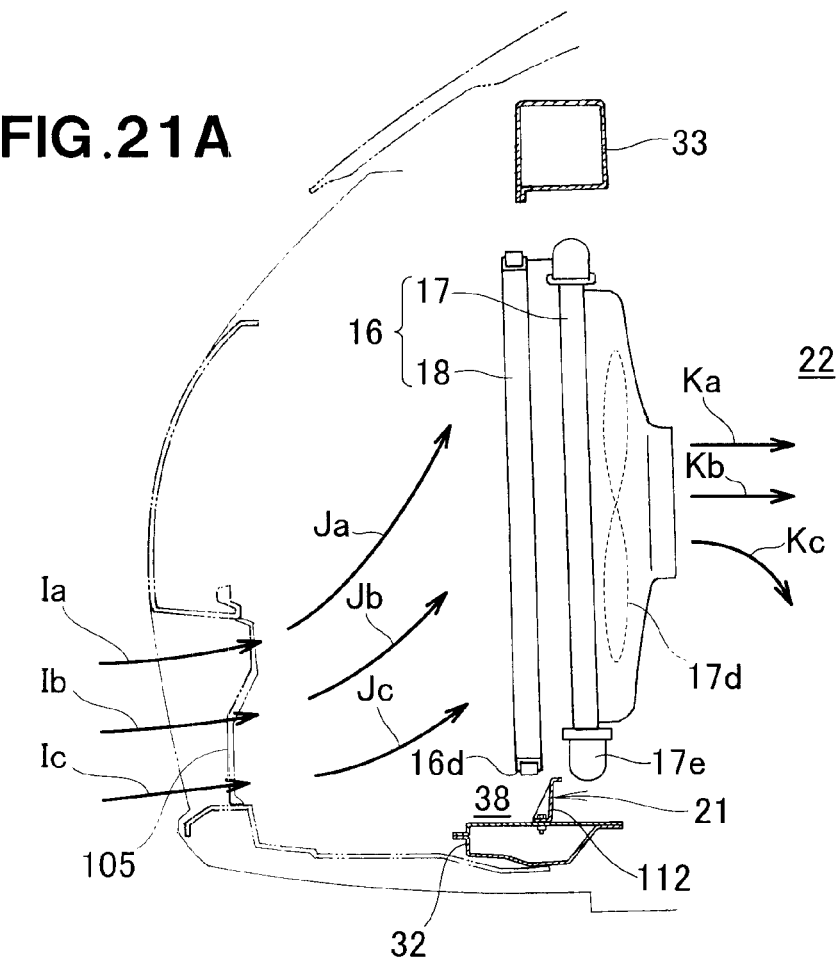
FIGS. 21A and 21B are views showing an example of the cooling system component being cooled by the air led in while the vehicle is traveling.

Air flows into the vehicle from the grill opening 105 while the vehicle is traveling as shown by arrows Ia, Ib, and Ic in FIG. 21A. The cooling fan 17d of the radiator 17 rotates. Consequently, the air flowing in from the grill opening 105 as shown by arrows Ia and Ib is led to the condenser 18 and the radiator 17 as shown by arrows Ja and Jb.

The wall panel 112 (the wall member 21) is provided to the space 38 between the lower beam 32 and the center bottom part 16d of the cooling system component 16. Consequently, the air flowing in from the grill opening 105 as shown by arrow Ic can be prevented from flowing to the space 38 by the wall panel 112. The air flowing in from the grill opening 105 as shown by arrow Ic is led to the condenser 18 and the radiator 17 by the wall panel 112 as shown by arrow Jc.

The rigidity (strength) of the wall panel 112 is improved by connecting the wall panel 112 and the attachment seat 111 by the reinforcing ribs 113, as shown in FIG. 12. Consequently, the wall panel 112 can be prevented from tilting rearward in the vehicle body by the air flowing in from the grill opening 105 as shown by arrow Ic. The air flowing in from the grill opening 105 as shown by arrow Ic is thereby led reliably to the condenser 18 and the radiator 17 by the wall panel 112 as shown by arrow Jc.

Thus, all of the air led into the vehicle as shown by arrows Ia, Ib, and Ic is led efficiently through the condenser 18 and the radiator 17 as shown by arrows Ja, Jb, and Jc. A suitable cooling performance in the condenser 18 and the radiator 17 can be ensured by all of the air passing through the condenser 18 and the radiator 17.

Most of the air that has passed through the condenser 18 and the radiator 17 is led to the rear of the engine compartment 22 as shown by arrows Ka and Kb. The rest of the air is guided to devices (not shown) inside the engine compartment 22 and led downward as shown by arrow Kc.

Figure 21B:
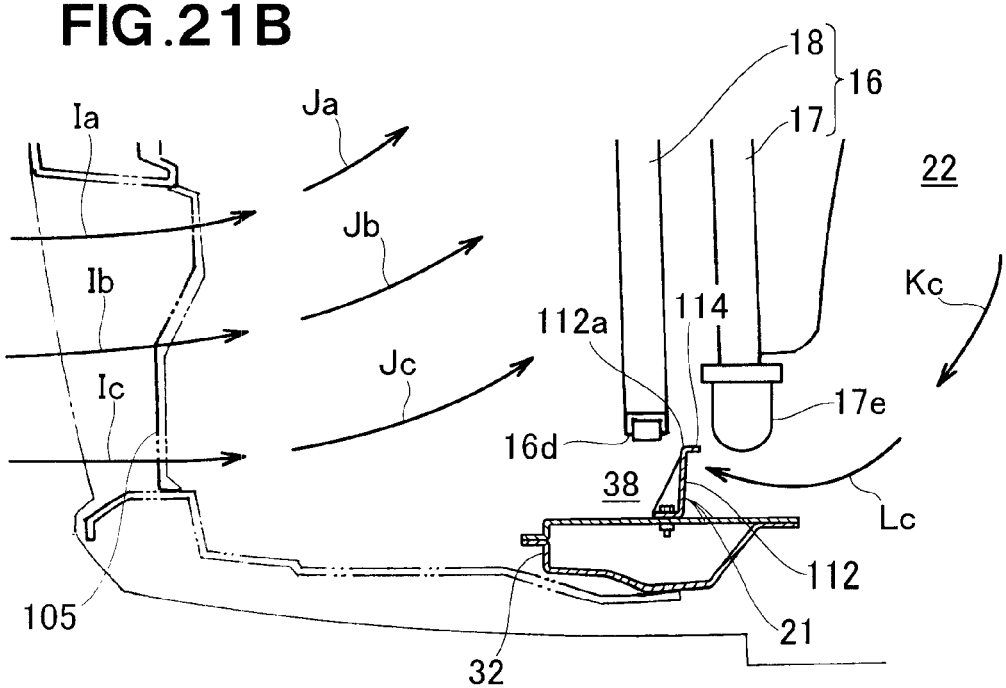

As shown in FIG. 21B, the air led downward as shown by arrow Kc flows from the bottom part 17e of the radiator 17 to the wall panel 112 as shown by arrow Lc.

The protruding piece 114 is provided to the top end 112a of the wall panel 112. Consequently, the flow of air returning to the wall panel 112 is blocked by the protruding piece 114, and the returned air is inhibited from flowing over the top end 112a of the wall panel 112. The air led downward as shown by arrow Lc is prevented from returning (recirculating) from the bottom part 17e of the radiator 17 to the front of the vehicle body via the protruding piece 114 of the wall panel 112. By preventing the air from recirculating to the front of the vehicle body, the air flowing in from the grill opening 105 as shown by arrows Ia, Ib, and Ic can be more efficiently led to the condenser 18 and the radiator 17. Therefore, the cooling performance of the condenser 18 and the radiator 17 can be further improved.

Next, an example of the cooling system component 16 vibrating up and down while the vehicle is traveling and an example of it vibrating forward and backward will be described based on FIG. 22.

Figure 22:
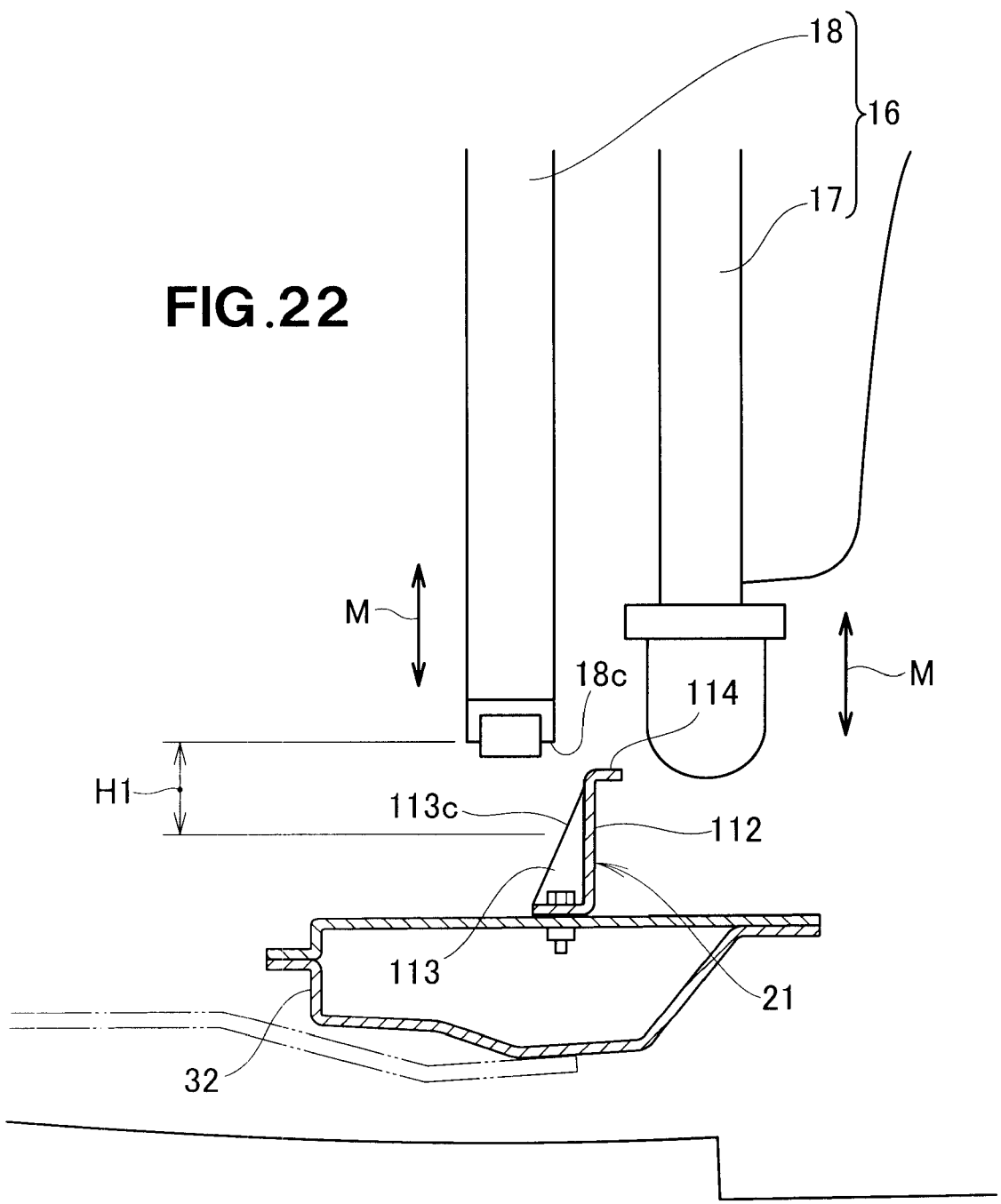
FIG. 22 is a view showing an example of the cooling system component vibrating up and down while the vehicle is traveling.

The wall panel 112 (the wall member 21) is disposed separately between the condenser 18 and the radiator 17 as shown in FIG. 22. Thereby, when the cooling system component 16 (the condenser 18 and the radiator 17) vibrates up and down due to traveling vibration of the vehicle as shown by arrow M, the condenser 18 and the radiator 17 do not interfere with the wall panel 112 (the wall member 21).

Additionally, by forming the reinforcing ribs 113 into a substantially triangular shape, the inclined sides 113c, which face toward the bottom part 18c of the condenser 18, can be distanced far below the bottom part 18c of the condenser 18. Consequently, a large distance H1 can be ensured between the inclined sides 113c and the bottom part 18c of the condenser 18. Thereby, when the cooling system component 16 (the condenser 18 and the radiator 17) vibrates up and down due to traveling vibration of the vehicle, interference with the inclined sides 113c (the wall member 21) by the condenser 18 and the radiator 17 is avoided.

Furthermore, the wall panel 112 is disposed as being separated from the condenser 18 and the radiator 17 in the forward-backward direction of the vehicle body. Even if the cooling system component 16 (the condenser 18 and the radiator 17) vibrates forward and backward when the vehicle is accelerating or stopping, the cooling system component 16 vibrating forward and backward does not interfere with the wall panel 112.

The vehicle body front structure 10 and the manufacturing method thereof according to the present invention are not limited to the embodiment previously described, and suitable modifications, improvements, and other changes can be made.

For example, in the previous embodiment, an example was described in which the top and bottom spring members 67, 93 were used as top and bottom resilient members, but the present invention is not limited to this example and hard rubber or another resilient member can also be used.

Furthermore, in the previous embodiment, an example was described in which an obstacle 98 lightly collided (an offset collision) with the left front part of the vehicle body front structure 10, but the present invention is not limited to this example, and the same effects can be achieved in cases in which an obstacle 98 collides lightly (an offset collision) with the right front part of the vehicle body front structure 10. Additionally, the same effects can be achieved in cases in which an obstacle 98 collides head-on (collides lightly) with the front part of the vehicle body front structure 10.

Furthermore, in the embodiment, an example was described in which an impact load during a light collision acted on the upper movement bracket 42 of the left top support mechanism 35 and the lower movement bracket 72 of the left bottom support mechanism 36, but the present invention is not limited to this example and the same effects can be achieved in cases in of a load greater than the impact load during a light collision.

Furthermore, in the embodiment, an example was described in which a pair of top fastening means 43 was provided to the left top support mechanism 35, but the present invention is not limited to this example and three or more top fastening means 43 may be provided.

Additionally, an example was described in which a pair of bottom fastening means 73 was provided to the left bottom support mechanism 36, but the present invention is not limited to this example and three or more bottom fastening means 73 can be provided.

Furthermore, the shapes and configurations of the vehicle body front structure 10, the front bulkhead 15, the cooling system component 16, the left top part 16a, the left bottom part 16b, the lower beam 32, the upper beam 33, the left and right top support mechanisms 35, the left and right bottom support mechanisms 36, the upper support bracket 41, the upper movement bracket 42, the top fastening means 43, the upper contact part 57, the slits 63, 86, the top fastening bolts 65, the top spring members 67, the lower support bracket 71, the lower movement bracket 72, the bottom fastening means 73, the lower contact part 82, the slot 87, the bottom fastening bolts 91, the bottom spring members 93, and other components presented in the embodiment are not limited to the examples given, and suitable modifications can be made.

The present invention is suitable for application in an automobile in which the top part of a cooling system component is provided to an upper beam of a front bulkhead and the bottom part of the cooling system component is provided to a lower beam.

Obviously, various minor changes and modifications of the present invention are possible in light of the above teaching. It is therefore to be understood that within the scope of the appended claims the invention may be practiced otherwise than as specifically described.

What is claimed is:

1. A vehicle body front structure including a front bulkhead having a an upper beam and a lower beam, and a cooling system component having a top part provided to the upper beam and a bottom part provided to the lower beam, said vehicle body front structure comprising:
    a top support mechanism, provided to the upper beam, for supporting the top part of the cooling system component in such a manner as to be movable rearwardly of a vehicle body; and
    a bottom support mechanism, provided to the lower beam, for supporting the bottom part of the cooling system component in such a manner as to be movable rearwardly of the vehicle body;
    wherein the top support mechanism comprises:
        an upper support bracket provided to the upper beam;
        an upper movement bracket provided to the top part of the cooling system component and having slits formed in a region thereof corresponding to the upper support bracket and opening forwardly of the vehicle body; and
        top fastening means having top fastening members passed through the slits in order to fasten the upper movement bracket to the upper support bracket;
    wherein the top fastening means includes a top resilient member located between the upper movement bracket and the top fastening members;
    wherein the bottom support mechanism comprises:
        a lower support bracket provided to the lower beam;
        a lower movement bracket provided to the bottom part of the cooling system component and having a slot formed in a region thereof corresponding to the lower support bracket and extending in a forward-backward direction of the vehicle body; and
        bottom fastening means having a bottom fastening bolt passed through the slot in order to fasten the lower movement bracket to the lower support bracket;
    wherein the bottom fastening means has a bottom resilient member positioned between the lower support bracket and the bottom fastening bolt;
    wherein the upper movement bracket and the upper support bracket are mountable to the top part of the cooling system component and the upper beam, respectively, with the upper movement bracket and the upper support bracket being fastened together by the top fastening means;
    wherein the lower movement bracket and the lower support bracket are mountable to the bottom part of the cooling system component and the lower beam, respectively, with the lower movement bracket and the lower support bracket being fastened together by the bottom fastener means, and
    wherein when the upper and lower movement brackets are subjected to an impact load acting from a front of the vehicle body, the slits formed in the upper movement bracket and the slot formed in the lower movement bracket allow the upper and lower movement brackets to move rearwardly of the vehicle body such that the rearward movement of the upper movement bracket causes the top fastening members to be removed from the slits in the upper movement bracket and the rearward movement of the lower movement bracket causes the bottom fastening bolt to remain passed through the slot in the lower movement bracket.

2. The vehicle body front structure of claim 1, wherein the upper movement bracket has an upper contact part on which a load acts rearwardly of the vehicle body, and the top fastening means is provided to both vehicle-widthwise sides of the upper movement bracket, and wherein the lower movement bracket has a lower contact part on which a load acts rearwardly of the vehicle body, and the bottom fastening means is provided to both vehicle-widthwise sides of the lower movement bracket.

3. A vehicle body front structure including a front bulkhead having an upper beam and a lower beam, and a cooling system component having a top part provided to the upper beam and a bottom part provided to the lower beam, said vehicle body front structure comprising:
    a top support mechanism, provided to the upper beam, for supporting the top part of the cooling system component in such a manner as to be movable rearwardly of a vehicle body;
    a bottom support mechanism, provided to the lower beam, for supporting the bottom part of the cooling system component in such as manner as to be movable rearwardly of the vehicle body; and
    a wall member disposed in a space between the lower beam and the bottom part of the cooling system component and partitioning the space to fore and aft,
    wherein the wall member comprises:
        an attachment seat attached to the lower beam;
        a wall panel rising from the attachment seat and partitioning the space to fore and aft; and
        substantially triangular reinforcing ribs connecting the wall panel and the attachment seat.

4. The vehicle body front structure of claim 3, wherein the wall member has a protruding piece protruding from a top end of the wall panel toward the cooling system component positioned at a rear part of the vehicle body.

5. The vehicle body front structure of claim 1, wherein the cooling system component includes a front cooling system component provided at a front part of the vehicle body, and a rear cooling system component provided on a rear part of the vehicle body, and the wall member is provided between the front cooling system component and the rear cooling system component.

6. A method for manufacturing a vehicle body front structure in which a top part of a cooling system component is provided to an upper beam of a front bulkhead, and a bottom part of the cooling system component is provided to a lower beam of the front bulkhead, the method comprising the steps of:
    fastening an upper movement bracket, which can be attached to the top part of the cooling system component, to an upper support bracket, which can be attached to the upper beam, by top fastening means so that the upper movement bracket is free to move toward the rear of the vehicle body, wherein the upper movement bracket, the upper support bracket and the top fastening means are assembled together and form a top support mechanism;
    fastening a lower movement bracket, which can be attached to the bottom part of the cooling system component, to a lower support bracket, which can be attached to the lower beam, by bottom fastening means so that the lower movement bracket is free to move toward the rear of the vehicle body, wherein the lower movement bracket, the lower support bracket, and the bottom fastening means are assembled together and form a bottom support mechanism;
    supporting the top part of the cooling system component on the upper movement bracket and attaching the upper support bracket to the upper beam while the top support mechanism is kept in an assembled condition; and supporting the bottom part of the cooling system component on the lower movement bracket and attaching the lower support bracket to the lower beam while the bottom support mechanism is kept in an assembled condition.

* * * * *